US012456797B2

(12) United States Patent
Hussain et al.

(10) Patent No.: US 12,456,797 B2
(45) Date of Patent: Oct. 28, 2025

(54) TWELVE ELEMENT DUAL-BAND MIMO ANTENNA FOR 5G SMARTPHONES

(71) Applicant: KING FAHD UNIVERSITY OF PETROLEUM AND MINERALS, Dhahran (SA)

(72) Inventors: Rifaqat Hussain, Dhahran (SA); Durria Abbasi, Bahawalpur (PK); Abdul Aziz, Bahawalpur (PK); Azzedine Zerguine, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 178 days.

(21) Appl. No.: 18/512,217

(22) Filed: Nov. 17, 2023

(65) Prior Publication Data

US 2025/0167428 A1 May 22, 2025

(51) Int. Cl.

*H01Q 1/24* (2006.01)
*H01Q 1/38* (2006.01)

(Continued)

(52) U.S. Cl.

CPC ............... *H01Q 1/243* (2013.01); *H01Q 1/38* (2013.01); *H01Q 5/35* (2015.01); *H01Q 21/08* (2013.01)

(58) Field of Classification Search

None

See application file for complete search history.

(56) References Cited

U.S. PATENT DOCUMENTS 6,417,806 B1 * 7/2002 Gothard ............... H01Q 21/061 343/702
11,223,103 B2 * 1/2022 Gu ....................... H01Q 9/0435

(Continued)

FOREIGN PATENT DOCUMENTS

CN 108565543 A * 9/2018 ............... H01Q 1/52
CN 207910052 U * 9/2018

(Continued)

OTHER PUBLICATIONS

Lin Et al, Compact Sub 6 GHZ Dual Band Twelve-Element MIMO Antenna for 5G Metal-Rimmed Smartphone Applications, Jul. 11, 2023 (Year: 2023).*

(Continued)

*Primary Examiner* — Crystal L Hammond

(74) *Attorney, Agent, or Firm* — Oblon, McClelland, Maier & Neustadt, L.L.P.

(57) ABSTRACT

A twelve element dual band multiple-input multiple-output (MIMO) antenna for a smartphone that includes a substrate, twelve single-element dual-band antennas and twelve T-shaped feed structures. The substrate has a top side, a bottom side, and four distinct side walls. The substrate accommodates twelve single-element dual-band antennas distributed along four side walls. Each single-element dual-band antenna includes a meandered slot line having two arms. Each arm is configured to radiate at specific resonant frequency. Twelve T-shaped feed structures are aligned in parallel with the twelve single-element dual band antennas and are located on the inner surfaces of the side walls, facilitating connectivity through feed ports located on the bottom side of the substrate. The twelve-element dual-band MIMO antenna array effectively radiates in a dual band at 2.4 GHz and 3.5 GHz in response to electrical signals input (Continued)

at the feed ports, achieving antenna diversity with good isolation.

18 Claims, 15 Drawing Sheets

(51) Int. Cl.

| | |
|---|---|
| ***H01Q 5/35*** | (2015.01) |
| ***H01Q 21/08*** | (2006.01) |

(56) References Cited

U.S. PATENT DOCUMENTS

| | | | | |
|---|---|---|---|---|
| 2017/0141473 | A1 | 5/2017 | Sharawi et al. | |
| 2020/0333855 | A1* | 10/2020 | Kim | G06F 1/1681 |
| 2020/0388918 | A1* | 12/2020 | Leung | H01Q 9/285 |

FOREIGN PATENT DOCUMENTS

| | | | | |
|---|---|---|---|---|
| CN | 110518346 A | * | 11/2019 | H01Q 9/42 |
| CN | 212062695 U | * | 12/2020 | |
| IN | 202241022910 A | | 5/2022 | |

OTHER PUBLICATIONS

Catherine M. Kruesi, et al., "Design and Development of a Novel 3-D Cubic Antenna for Wireless Sensor Networks (WSNs) and RFID Applications", IEEE Transactions on Antennas and Propagation, vol. 57, No. 10, Oct. 2009, pp. 3293-3299.

* cited by examiner

TWELVE ELEMENT DUAL-BAND MIMO ANTENNA FOR 5G SMARTPHONES

CROSS REFERENCE TO RELATED APPLICATIONS

The present application is related to "10×10 Single-Band MIMO Antenna For 5G Smartphones", U.S. application Ser. No. 18/512,217, filed on Nov. 17, 2023, which is incorporated herein by reference in its entirety.

BACKGROUND

Technical Field

The present disclosure is directed to a dual-band Multiple-Input Multiple-Output (MIMO) antenna, having twelve antenna elements arranged in specific geometric configuration, in which antenna elements are arranged on an outer surface of side walls of a substrate to achieve radiation diversity in a fifth generation (5G) wireless communication system.

Description of Related Art

The "background" description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present invention.

Fifth Generation (5G) mobile communication technology offers several advantages, such as high communication rates, low latency, large connection density, and high communication capacity. To meet these goals and improve channel capacity in a rich scattering environment, MIMO antennas have become a key technology in the new generation of wireless communication systems. MIMO technology involves the incorporation of multiple antenna elements at both the transmitting and receiving ends, thereby not only mitigating fading losses but also substantially augmenting data throughput capacities beyond the limitations imposed by single-input-single-output (SISO) systems. MIMO antennas enhance channel capacity through multiple independently placed elements, but due to the narrow space of terminals, spatial diversity cannot always be achieved. Therefore, other diversity techniques, such as polarization diversity and radiation pattern diversity, are used in MIMO systems. MIMO antennas employ a range of technologies, such as structured monopoles, slot antennas, folded loop antennas, planar inverted-F antenna (PIFA), and dual-polarized antennas.

Patent application US20170141473A1 described a four element MIMO antenna that is formed such that two arms of each antenna extend to the periphery of a substrate. However, the antenna elements are not formed directly on the edge of the substrate. Additionally, each antenna element required dedicated circuitry such as PIN and varactor diodes.

Patent application IN202242022910A described a dual generation dual polarized MIMO antenna for simultaneous operation of 4G and 5G base transceiver station applications. The described antenna operated in 2.6 GHz and 3.5 GHz bands. However, the antenna of this reference lacks continuous frequency band tuning, a simple feeding mechanism, and low-profile antenna architecture.

A 3-D cubic antenna operating in the 902-928 MHz UHF frequency range, having dimensions of 3 cm×3 cm×3 cm (27 cm3), and formed on a styrofoam substrate, was described. (See: Catherine M. Kruesi, Rushi J. Vyas, and Manos M. Tentzeris, "*Design and development of a novel 3-D cubic antenna for wireless sensor networks (WSNS) and RFID applications*"). However, this 3-D cubic antenna is not suitable for 5G applications and is large in size.

An eight element MIMO antenna with rectangular ground slot was described (See: S. H. Kiani et al., "*High Performance Eight-Port Dual-Band MIMO Antenna System for 5G Devices*," Micromachines, vol. 13, no. 6, p. 959, 2022). However, this eight element MIMO antenna requires a parasitic element for impedance matching.

A dual-band MIMO quad-antenna system was described that has dimensions 0.165×0.164×0.006 $\lambda^3$ at 2.4 GHz. (See: S.-C. Chen, J.-L. Zhu, and C.-I. Hsu, "*Compact Double Shorted Loop Sub-6-GHZ Dual-Band MIMO Quad-Antenna System," IEEE Access*, vol. 9, pp. 114672-114679, 2021). However, the antenna of this reference employs a series 0.3 pF chip capacitors.

A dual-band 8×8 MIMO antenna for multiple-output (MIMO) smartphone was described (See: D. Serghiou, M. Khalily, V. Singh, A. Araghi, and R. Tafazolli, "*Sub-6 GHZ dual-band 8×8 MIMO antenna for 5G smartphones*," IEEE Antennas Wirel. Propag. Lett., vol. 19, no. 9, pp. 1546-1550, 2020). However, this MIMO antenna requires a 7.8 mm short neutral line for mutual coupling reduction at both frequency bands.

A compact double-loop sub-6-GHz dual-band MIMO quad-antenna system was described that has dimensions 0.165×0.164×0.006 13 at 2.4 GHz (See: W. Hu et al., "*Dual-band ten-element MIMO array based on dual-mode IF As for 5G terminal applications*," IEEE Access, vol. 7, pp. 178476-178485, 2019). However, the antenna system of this reference requires a series chip capacitor for tuning the high-frequency resonance mode.

A compact dual-band 8×8 MIMO antenna array was described that is configured to operate in (3.4-3.6 GHz) and (5.15-5.925 GHz) only. (See: H. Zou, Y. Li, C.-Y.-D. Sim, and G. Yang, "*Design of 8×8 dual-band MIMO antenna array for 5 G smartphone applications*," Int. J. RF Microw. Comput. Eng., vol. 28, no. 9, p. e21420, 2018). Each of the aforementioned references suffers from one or more drawbacks hindering their adoption.

Hence, there is a need for a twelve-element dual band MIMO antenna system with an increased number of antenna elements, exhibiting dual-band characteristics to achieve superior radiation efficiency, improved isolation, and reduced reflection coefficients while maintaining a compact form suitable for integration into smartphones.

SUMMARY

In an exemplary embodiment, a twelve element dual band multiple-input multiple-output (MIMO) antenna for a smartphone is described. The MIMO antenna includes a substrate, twelve single element dual band antennas, twelve T-shaped feed structures, and a ground plane. The substrate includes a top side, a bottom side, a first side wall, a second side wall opposite the first side wall, a third side wall perpendicular to the first side wall, and a fourth side wall opposite the third side wall. A first four of the twelve single element dual band antennas are spaced along an outer surface of the first side wall, a second four of the single element dual band antennas are spaced along an outer surface of the second side wall, a third two of the single element dual band antennas are spaced along an outer surface of the third side wall, and a fourth two of the single element dual band antennas are spaced along an oblique surface of the third side wall. Each single element dual band antenna includes a meandered slot line with a first arm and a second arm. The first arm is separated from the second arm by a slit. The twelve T-shaped feed structures include a first set of four of the T-shaped feed structures located on an inner surface of the first side wall, a second set of four of the T-shaped feed structures located on an inner surface of the second side wall, a third set of two T-shaped feed structures located on an inner surface of the third side wall, and a fourth set of two T-shaped feed structures located on an inner surface of the fourth side wall. Each of the first four T-shaped feed structures is located directly behind and centered on a single element dual band antenna located on the outer surface of the first side wall. Each of the second set of four T-shaped feed structures is located directly behind and centered on a single element dual band antenna located on the outer surface of the second side wall. Each of the third set of two T-shaped feed structures is located directly behind and centered on a single element dual band antenna located on the outer surface of the third side wall. Each of the four sets of two T-shaped feed structures is located directly behind and centered on a single element dual band antenna located on the outer surface of the fourth side wall. Each T-shaped feed structure is connected to a feed port located on the bottom side of the substrate. The ground plane is located on the bottom side of the substrate. The first arm and the second arm are connected to the ground plane. Each antenna of the twelve element dual band MIMO antenna is configured to radiate from the first arm at a frequency of about 2.4 GHz and to radiate from the second arm at a frequency of about 3.5 GHz in response to an electrical signal applied to its respective feed port.

In another exemplary embodiment, a smartphone having a twelve element dual band multiple-input multiple-output (MIMO) antenna is described. The smartphone includes a smartphone housing, a battery, a radio frequency (RF) circuit, a twelve element dual band MIMO antenna, and twelve T-shaped feed structures. The battery includes a battery ground terminal and a battery voltage terminal. The battery is located within the smartphone housing. The radio frequency (RF) circuit is located within the smartphone housing. The RF circuit includes a power amplifier connected to the battery ground terminal and the battery voltage terminal, a low noise amplifier connected to the power amplifier, a mixer operatively connected to the power amplifier and the low noise amplifier, an RF circuitry voltage output terminal and an RF circuitry ground terminal, and a twelve-element dual band MIMO antenna located within the smartphone housing. The twelve element dual band MIMO antenna is configured as twelve single element dual band antennas. Each of the twelve single element dual band antennas is connected to the RF circuitry ground terminal. Each single element dual band antenna comprises a meandered slot line with a first arm and a second arm. The first arm is separated from the second arm by a slit. Each of the twelve T-shaped feed structures is connected to a feed port. Each feed port is connected to the RF circuitry voltage output terminal. The RF circuitry is configured to generate electrical signals, and each antenna of the twelve element dual band MIMO antenna is configured to radiate from the first arm at a resonant frequency of about 2.4 GHz and from the second arm at a resonant frequency of about 3.5 GHz in response to the electrical signals received at its respective feed port.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
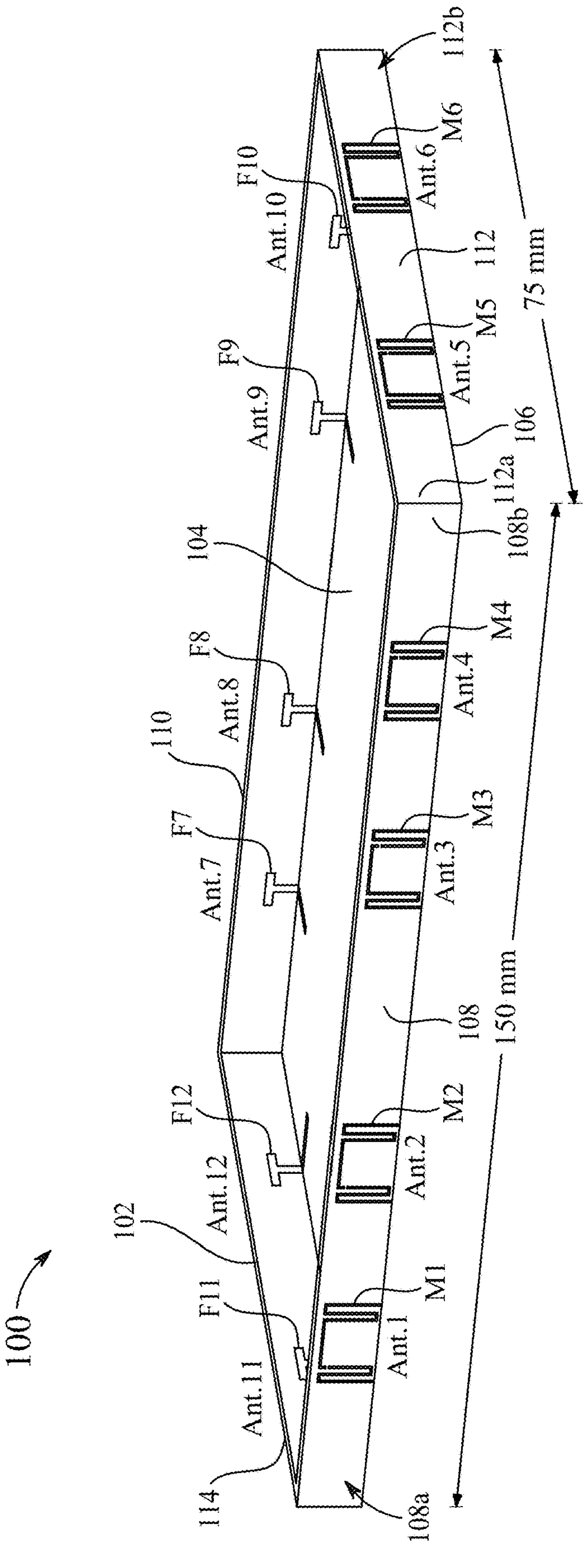
FIG. 1A illustrates a geometrical representation of a twelve element dual band multiple-input multiple-output (MIMO) antenna, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Incorporating a high number of antenna elements to meet the high data transmission rate in a wireless communication system into the compact space of a smartphone is a challenging task. Additionally, it is important to ensure low latency, effective isolation between the antenna elements, and efficient multiband functionality. The various conventional systems offered configurations of antenna elements, utilizing a range of shapes and structural innovations. However, challenges associated with higher orders of the antenna remain unaddressed.

Aspects of the disclosure are directed to a twelve element dual band multiple-input multiple-output (MIMO) antenna for a communication device (for example, smartphones). To balance a high number of antenna elements with efficient operation in specified frequency bands and substantial isolation between elements, the twelve element dual band MIMO antenna system incorporates a specific arrangement of twelve single element antennas. The MIMO antenna system is implemented on a substrate with four walls, and the twelve single element dual band antennas are strategically placed on the four walls of the substrate. Each of the twelve single element dual band antennas has specific dimensions and is placed at a specific distance from an adjacent single element dual band antenna to effectively radiate at dual resonant frequencies. The MIMO antenna operates in sub 6 GHz band ranges from 2.3-2.45 GHz and 3.4-3.6 GHz. Further, a center frequency of both the bands can be controlled by varying the corresponding resonant lengths of the single element dual band antenna during a design phase, independently.

Figure 1B:
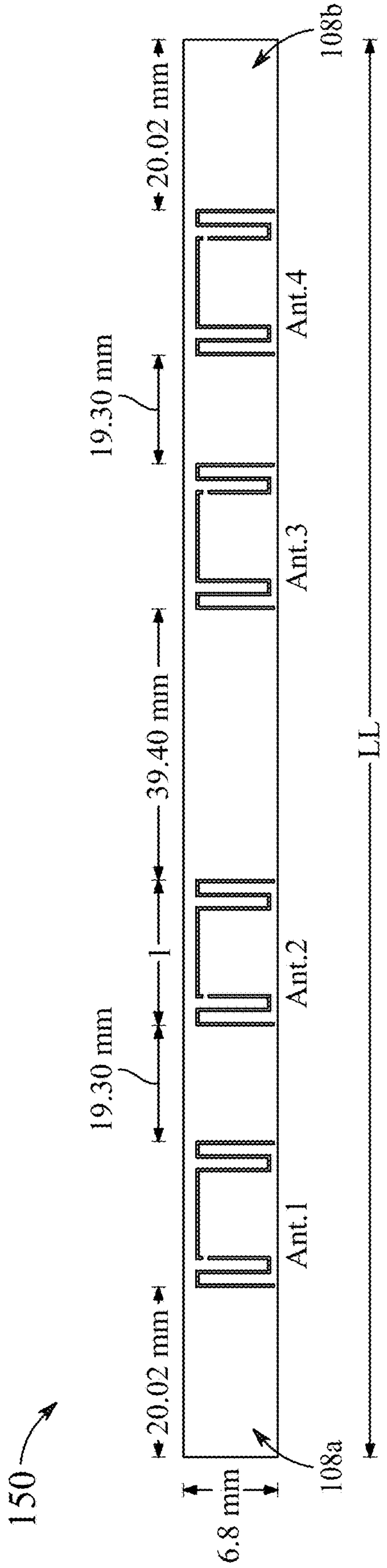
FIG. 1B illustrates a perspective view of antenna elements located on a long edge of a substrate, according to certain embodiments.

FIG. 1A-FIG. 1B illustrate a structural diagram of a twelve element dual band multiple-input multiple-output (MIMO) antenna for a smartphone. FIG. 1A may be read in conjunction with FIG. 2A for a better understanding. In the drawings of FIG. 1A-FIG. 2B, dimensions shown are for the example of a 150×75 $mm^2$ circuit board (substrate) and should not be construed as limiting. For a circuit board less than 150×75 $mm^2$, the dimensions are proportionately smaller. Similarly, for a circuit board greater than 150×75 $mm^2$, the dimensions are proportionately larger.

FIG. 1A shows a geometrical representation of the twelve-element dual band multiple-input multiple-output (MIMO) antenna 100 (referred as to "MIMO antenna 100" hereinafter), for a for a smartphone or other diversity enabled communications device. The MIMO antenna 100 includes a substrate 102, a plurality of single element dual band antennas, and a plurality of T-shaped feed structures and a ground plane (not shown in FIGS.). For example, the plurality of single element dual band antennas includes twelve single element dual band antennas referred to as antenna 1, antenna 2, antenna 3, antenna 4, antenna 5, antenna 6, antenna 7, antenna 8, antenna 9, antenna 10, antenna 11, and antenna 12. The plurality of T-shaped feed structures includes twelve T-shaped feed structures referred to as: F1, F2, F3, F4, F5, F6, F7, F8, F9, F10, F11, and F12. Each single element dual band antenna of the plurality of single element dual band antennas is connected to a dedicated T-shaped feed structure. For example, the antenna 1 is connected to F1, and the antenna 2 is connected to F2.

FIG. 1A depicts exemplary aspects of a systematic and strategic placement of the twelve single element dual band antennas (also known as "antenna elements") on the substrate 102 to facilitate polarization diversity. The substrate 102 has length, width, and thickness dimensions of about 150 mm×about 75 mm×about 0.8 mm respectively. The dimensions are exemplary and are to be considered in a proportionated manner and should not be construed as limiting. The substrate 102 includes a top side 104, a bottom side 106, a first side wall 108, a second side wall 110, a third side wall 112, and a fourth side wall 114. The first side wall 108 is opposite to and parallel to the first side wall. The third side wall 112 is perpendicular to the first side wall 108. The fourth side wall 114 is opposite to and parallel to the third side wall 112.

In an example, the substrate 102 is a flame retardant (FR)-4 lossy dielectric plate. FR-4 (or FR4) is a glass-reinforced epoxy laminate material. FR-4 is a composite material composed of woven fiberglass cloth with an epoxy resin binder that is flame-resistant (self-extinguishing). In an example, a thin layer of copper foil is typically laminated to one or both sides of the FR-4 lossy dielectric plate.

In an example, the first side wall 108 and the second side wall 110 have equal dimensions. In a non-limiting example, each of the first side wall 108 and the second side wall 110 has length, height and thickness dimensions of about 150 mm by about 6.8 mm by about 0.8 mm, respectively. Each of the third side wall and the fourth side wall 114 has length, height and thickness dimensions of about 75 mm by about 6 mm by about 0.8 mm, respectively.

Figure 2A:
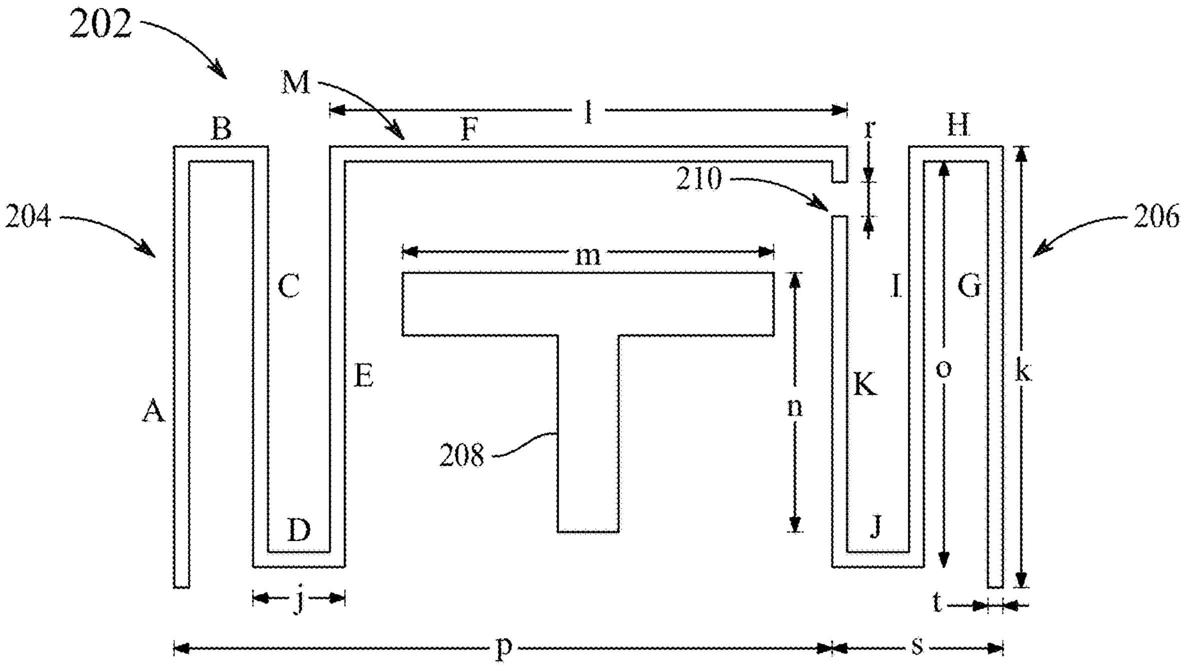
FIG. 2A illustrates a structural diagram of a single element dual band antenna, according to certain embodiments.

As shown in FIG. 1A, the twelve single element dual band antennas (antenna elements) includes four set of antenna elements, located on each wall of the substrate 102. A first four single element dual band antennas (a first set of the twelve single element dual band antennas), for example, antenna 1, antenna 2, antenna 3, and antenna 4, are spaced along an outer surface of the first side wall 108. A second four of the single element dual band antenna elements (a second set of the twelve single element dual band antennas), for example, antenna 7, antenna 8, antenna 9, and antenna 10 are spaced along an outer surface of the second side wall 110. Two of the single element dual band antennas (a third set of the twelve single element dual band antennas), for example, antenna 5 and antenna 6, are spaced along an outer surface of the third side wall 112. Two of the single element dual band antennas (a fourth set of the twelve single element dual band antennas), for example, antenna 11 and antenna 12, are spaced along an outer surface of the fourth side wall 114. Referring to FIG. 2A, each single element dual band antenna includes a meandered slot line. For example, the antenna 1 includes the meandered slot line M1.

The twelve T-shaped feed structures include a first set of four of the T-shaped feed structures (F1, F2, F3, and F4), a second set of four of the T-shaped feed structures (F7, F8, F9, and F10), a third set of two T-shaped feed structures (F5 and F6), and a fourth set of two T-shaped feed structures (F11 and F12). The first set of four of the T-shaped feed structures (F1, F2, F3, and F4) is located on an inner surface of the first side wall 108. Each of the first set of four T-shaped feed structures is located directly behind and centered with a single element dual band antenna located on the outer surface of the first side wall 108. For instance, at the outer surface of the first side wall 108, four single elements (antenna 1, antenna 2, antenna 3, and antenna 4) are placed. Right behind each of the single elements and centered on a respective single element antenna, F1, F2, F3, and F4 are placed at the inner surface of the first side wall 108.

The second set of four of the T-shaped feed structures (F7, F8, F9, and F10) is located on an inner surface of the second side wall 110. Each of the second set of four T-shaped feed structures is located directly behind and centered with a single element dual band antenna located on the outer surface of the second side wall 110. For instance, at the outer surface of the second side wall 110, four single elements (antenna 7, antenna 8, antenna 9, and antenna 10) are placed. Right behind the single elements and at center, F7, F8, F9, and F10 are placed at the inner surface of the second side wall 110.

The third set of two T-shaped feed structures (F5 and F6) is located on an inner surface of the third side wall 112. Each of the third set of two T-shaped feed structures is located directly behind and centered with a single element dual band antenna located on the outer surface of the third side wall 112. For instance, at the outer surface of the third side wall 112, two single elements (antenna 5 and antenna 6) are placed. Right behind the single elements and at center, F5 and F6 are placed at the inner surface of the third side wall 112.

The fourth set of two T-shaped feed structures (F11 and F12) is located on an inner surface of the fourth side wall 114. Each of the fourth set of two T-shaped feed structures is located directly behind and centered with a single element dual band antenna located on the outer surface of the fourth side wall 114. For instance, at the outer surface of the fourth side wall 114, two single elements (antenna 11 and antenna 12) are placed. Right behind the single elements and at center, F11 and F12 are placed at the inner surface of the fourth side wall 114.

Each of the T-shaped feed structure, including F1, F2, F3, F4, F5, F6, F7, F8, F9, F10, F11, and F12, are connected to a feed port located on the bottom side 106 of the substrate 102. In an example, the feed port is a 50Ω SMA connector. The SMA (SubMiniature version A) connector is configured to transmit high-frequency signals. The 50Ω SMA connector is integrated through holes fabricated at the backside of the substrate 102, thereby establishing a robust connection pathway for the antenna elements. In an example, a height of each T-shaped feed structure is about 4.25 mm, and a width of the crossbar of the T of the T-shape is about 5.0 mm.

The ground plane is located on the bottom side 106 of the substrate 102. A first arm and a second arm of each single element dual band antenna are connected to the ground plane.

In an aspect, the antenna elements are printed on the substrate 102 using, for example, inkjet printing technique. Inkjet printing on the substrate 102 is performed by transferring the circuit design on circuit material. The circuit design can be crafted through graphic design applications or sourced from a pre-existing image through scanning. Subsequently, the ink required for printing undergoes preparation to meet the defined specifications necessitated for the job. The preparation entails combining the ink with solvents or other additives to enhance its functional properties. Following the ink preparation, the ink is loaded into the inkjet printer, aligning concurrently with the placement of the substrate 102 in the designated tray of the printer. The nozzles of the printer meticulously dispense a metallic ink onto the substrate 102, following the pattern dictated by the design. This is achieved through a precise array of nozzles that delineate the metallic ink onto the material in accordance with the mapped-out pattern. Post printing, a drying period is instituted to allow the metallic ink to settle and dry thoroughly, a duration that varies based on the specifics of the metallic ink and the substrate 102. The drying period can span a few minutes to several hours. The dried printed substrate 102 may undergo further treatments like lamination, cutting, or binding, dictated by the end-use of the product.

Figure 2B:
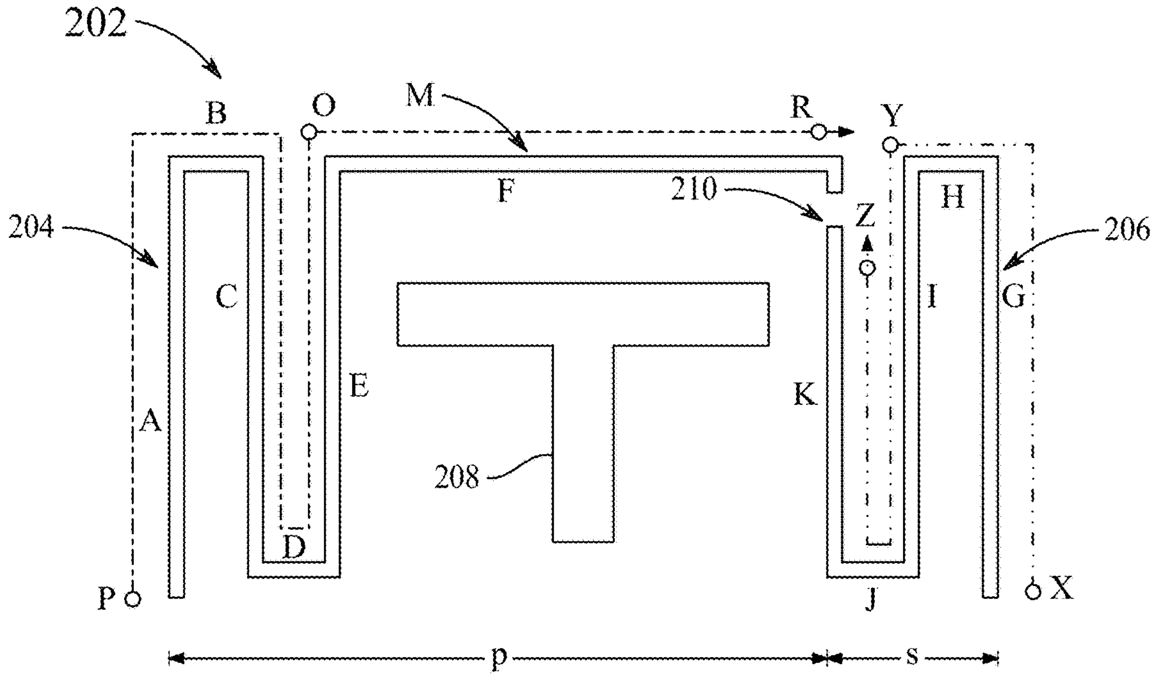
FIG. 2B illustrates a structural diagram of the single element dual band antenna with specific parameter values, according to certain embodiments.

FIG. 1B illustrates a perspective view 150 of a longer edge of the substrate 102. FIG. 1B also illustrates the distances between the adjacent antenna elements of MIMO antenna 100. In an example, the first side wall 108 and the second side wall 110 are the longer edges of the substrate 102. As shown in FIG. 2B, the longer edge has a length (LL) of 150 mm. The longer edge portrays placement of the four antenna elements, emphasizing the inter-element spacing. For instance, at the longer edge as shown by the first side wall 108, four single elements (antenna 1, antenna 2, antenna 3, antenna 4) are placed.

The first single element dual band antenna (ant.1) is spaced at a distance of about 20.02 mm from a first end 108*a* of the outer surface of the first side wall 108. The second single element dual band antenna (ant.2) is spaced at a distance of about 19.3 mm from the first single element dual band antenna (ant.1). The third single element dual band antenna (ant.3) is spaced at a distance of about 39.4 mm from the second single element dual band antenna (ant.2). The fourth single element dual band antenna (ant.4) is spaced at a distance of about 19.3 mm from the third single element dual band antenna (ant.3) and at a distance of about 20.02 mm from a second end 108*b* of the first side wall 108.

The fifth single element dual band antenna (ant.5) is spaced at a distance of about 15.3 mm from a first end 112*a* of the outer surface of the third side wall 112. The sixth single element dual band antenna (ant.6) is spaced at a distance of about 22 mm from the fifth single element dual band antenna (ant.5) and at a distance of about 15.3 mm from a second end 112*b* of the outer surface of the third side wall 112.

The seventh single element dual band antenna (ant.7) is spaced at a distance of about 20.02 mm from a first end of the outer surface of the second side wall 110. The eighth single element dual band antenna (ant.8) is spaced at a distance of about 19.3 mm from the seventh single element dual band antenna (ant.7). The ninth single element dual band antenna (ant.9) is spaced at a distance of about 39.4 mm from the eighth single element dual band antenna (ant.8). The tenth single element dual band antenna (ant.10) is spaced at a distance of about 19.3 mm from the ninth single element dual band antenna (ant.9) and at a distance of about 20.02 mm from a second end of the second side wall 110.

The eleventh single element dual band antenna (ant. 11) is spaced at a distance of about 15.3 mm from a first end of the outer surface of the fourth side wall 114. The twelfth single element dual band antenna (ant.12) is spaced at a distance of about 22 mm from the eleventh single element dual band antenna (ant.11) and at a distance of about 15.3 mm from a second end of the outer surface of the fourth side wall 114.

In an example, an inter element space between each single element dual band antenna is about 20 mm. The inter element space may be defined as a distance between the respective feeds of two adjacent antenna elements. For example, the distance between the T-shaped feed structure of the antenna 1 and the T-shaped feed structure of the antenna 2 is denoted by the inter element space.

Figure 1C:
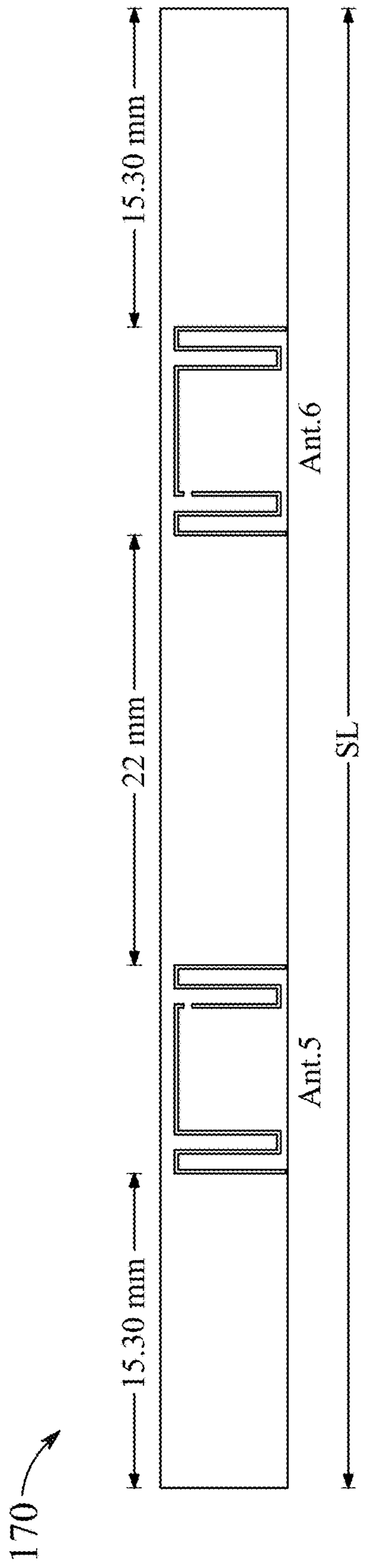
FIG. 1C illustrates a perspective view of antenna elements located on a short edge of the substrate, according to certain embodiments.

FIG. 1C illustrates a perspective view 170 of the shorter edge of the substrate 102. In an example, each of the third side wall 112 and the fourth side wall 114 are on the shorter edges of the substrate 102. As shown in FIG. 1C, the shorter edge has a length (SL) of about 75 mm. The third side wall 112 and the fourth side wall 114 each have length, height, and thickness dimensions of about 75 mm×about 6 mm×about 0.8 mm respectively.

The shorter edge shown in FIG. 1C portrays placement of the two antenna elements, emphasizing the inter-element spacing. For instance, at the shorter edge illustrated by the third side wall 112, two single elements, fifth single element (ant.5) and sixth single element (ant.6) are placed. Each single element is of a length of 11.20 mm. The sixth single element (ant.6) is placed from the fifth single element (ant.5) at 22 mm.

The fifth single element (ant.5) is placed at 15.30 mm from the first end of the outer surface of the third side wall 112. The distance is measured by a first leg G of the second arm of the fifth single element (ant.5). The sixth single element (ant.6) is at 15.30 mm from the second end of the third side wall 112. The distance is measured by a first leg A of the first arm of the sixth single element (ant.6).

FIG. 2A-FIG. 2B show the configuration of an individual single element dual band antenna 202. According to an aspect, the effective functioning of the elements and overall performance of the MIMO antenna 100 result from the geometric configuration of the single element dual band antenna 202.

FIG. 2A illustrates a structural diagram of a single element dual band antenna 202 of the MIMO antenna 100. The geometric attributes of the single element dual band antenna are configured with precise dimensions and a structure that delivers the performance of the antenna. For example, each single element dual band antenna has length, height, and thickness dimensions of about 11.20 mm, about 5.98 mm, and about 0.02 mm, respectively. For a single element dual band antenna smaller than 11.20 mm×about 5.98 mm×about 0.02 mm, the dimensions are proportionately smaller. For a single element dual band antenna greater than 11.20 mm×about 5.98 mm×about 0.02 mm, the dimensions are proportionately greater. The dimensions affirm the compact nature of the structure for fabrication.

As shown in FIG. 2A-FIG. 2B, the single element dual band antenna 202 includes a meandered slot line M. The meandered slot line M includes a first arm 204 and a second arm 206. The first arm 204 is separated from the second arm 206 by a slit 210. Each single element dual band antenna 202 is provided with a T-shaped feeding structure 208. The T-shaped feeding structure 208 is powered by an input voltage. Upon receiving the input voltage, the T-shaped feeding structure 208 is configured to excite the antenna element. Each single element dual band antenna of the MIMO 100 antenna is configured to radiate from the first arm at a frequency of about 2.4 GHz and to radiate from the second arm at a frequency of about 3.5 GHz in response to an electrical signal applied to its respective feed port.

In a structural aspect, the first arm 204 is formed by a first leg A, a second leg B, a third leg C, a fourth leg D, a fifth leg E, and a sixth leg F. The first leg A is perpendicular to the bottom side 106. The first leg includes a first end and a second end. The first end of the first leg A is connected to the ground plane. The second end of the first leg A is located near an upper end of a respective side wall. In an example, the first leg A has a length of about 5.98 mm as shown in Table 1 below.

The second leg B includes a first end and a second end. The first end of the second leg B is connected to the second end of the first leg A. The second leg B is perpendicular to the first leg A. The second leg B is configured to extend towards the second arm 206. In an example, the second leg B has a length of about 0.85 mm.

The third leg C includes a first end and a second end. The first end of the third leg C is connected to the second end of the second leg B. The third leg C is perpendicular to the second leg B. The third leg C is configured to extend towards the bottom side. In an example, the third leg C has a length of about 5.5 mm.

The fourth leg D includes a first end and a second end. The first end of the fourth leg D is connected to the second end of the third leg C. The fourth leg D is parallel to the bottom side 106 and is configured to extend towards the second arm 206. In an example, the fourth leg D has a length of about 0.85 mm.

The fifth leg E includes a first end and a second end. The first end of the fifth leg E is connected to the second end of the fourth leg D. The fifth leg E is perpendicular to the fourth leg D. The fifth leg E is configured to extend from the bottom side 106 towards the upper end of the respective side wall. In an example, the fifth leg E has a length of about 5.5 mm.

The sixth leg F includes a first end and a second end. The first end of the sixth leg F is connected to and perpendicular to the fifth leg E. The sixth leg F extends towards second arm 206 and ends at the slit 210. In an example, the sixth leg F has a length of about 7 mm.

In one example, a width of the meandered slot line of each of the first leg A, the second leg B, the third leg C, the fourth leg D, the fifth leg E, and the sixth leg F is about 0.2 mm.

In a structural aspect, as shown in FIG. 2A, the second arm 206 is formed by five legs referred to as a first leg G, a second leg H, a third leg I, a fourth leg J, and a fifth leg K. The first leg G includes a first end and a second end. The first leg G of the second arm 206 is perpendicular to the bottom side 106 (as shown in FIG. 1A). The first end of the first leg G is connected to the ground plane and the second end of the first leg G is located near an upper end of a respective side wall. In an example, the first leg G has a length of about 5.98 mm.

The second leg H includes a first end and a second end. The first end of the second leg H is connected to the second end of the first leg G. The second leg H is perpendicular to the first leg G. The second leg H is configured to extend towards the first arm 204. In an example, the second leg H has a length of about 0.85 mm.

The third leg I includes a first end and a second end. The first end of the third leg I is connected to the second end of the second leg H. The third leg I is perpendicular to the second leg H. The third leg I is configured to extend towards the bottom side 106. In an example, the third leg I has a length of about 5.5 mm.

The fourth leg J includes a first end and a second end. The first end of the fourth leg J is connected to the second end of the third leg I. The fourth leg J is parallel to the bottom side 106 and is configured to extend towards the first arm 204. In an example, the fourth leg J has a length of about 0.85 mm.

The fifth leg K includes a first end and a second end. The first end of the fifth leg K is connected to a second end of the fourth leg J. The fifth leg K is perpendicular to the fourth leg J. The fifth leg K is configured to extend from the bottom side 106 towards the slit 210. In an example, the fifth leg K has a length of about 5.0 mm.

In an example, the width of each of the first leg G, the second leg H, the third leg I, the fourth leg J, and the fifth leg K is about 0.2 mm.

FIG. 2B illustrates the structural diagram of the single element dual band antenna with specific parameter values. The first arm 204 is configured as a zig-zag line connecting the points P, O, and R, as shown in FIG. 2B. The second arm 206 is a zig-zag line connecting the points X, Y, and Z. The dimension of the arms of the single element dual band antenna are proportioned for effective tuning of the single element dual band antenna in order to resonate each arm at one of the dual bands independently. The first arm 204 is configured to facilitate the tuning of the 2.4 GHz frequency band. The second arm 206 is configured to facilitate the tuning of the 3.5 GHz frequency band. The slit 210, as shown on 'r' in FIG. 2A, is configured to enhance a dual-band functionality of the MIMO antenna.

The dimensions of the first arm 204 and the second arm 206 were achieved by experimenting with varying sizes of the legs and observing their impacts simultaneously. In an example, the first arm 204 and the second arm 206 are configured to have the dimensional values listed in Table 1.

TABLE 1

Defined dimensions of the first arm 204 and the second arm 206

| Parameters | Dimensions in mm |
|---|---|
| l | 7 |
| m | 5 |
| n | 4.25 |
| r | 0.45 |
| o | 5.5 |
| k | 5.98 |
| t | 0.2 |
| j | 0.85 |
| p | 9.1 |
| s | 2.1 |

Figure 2C:
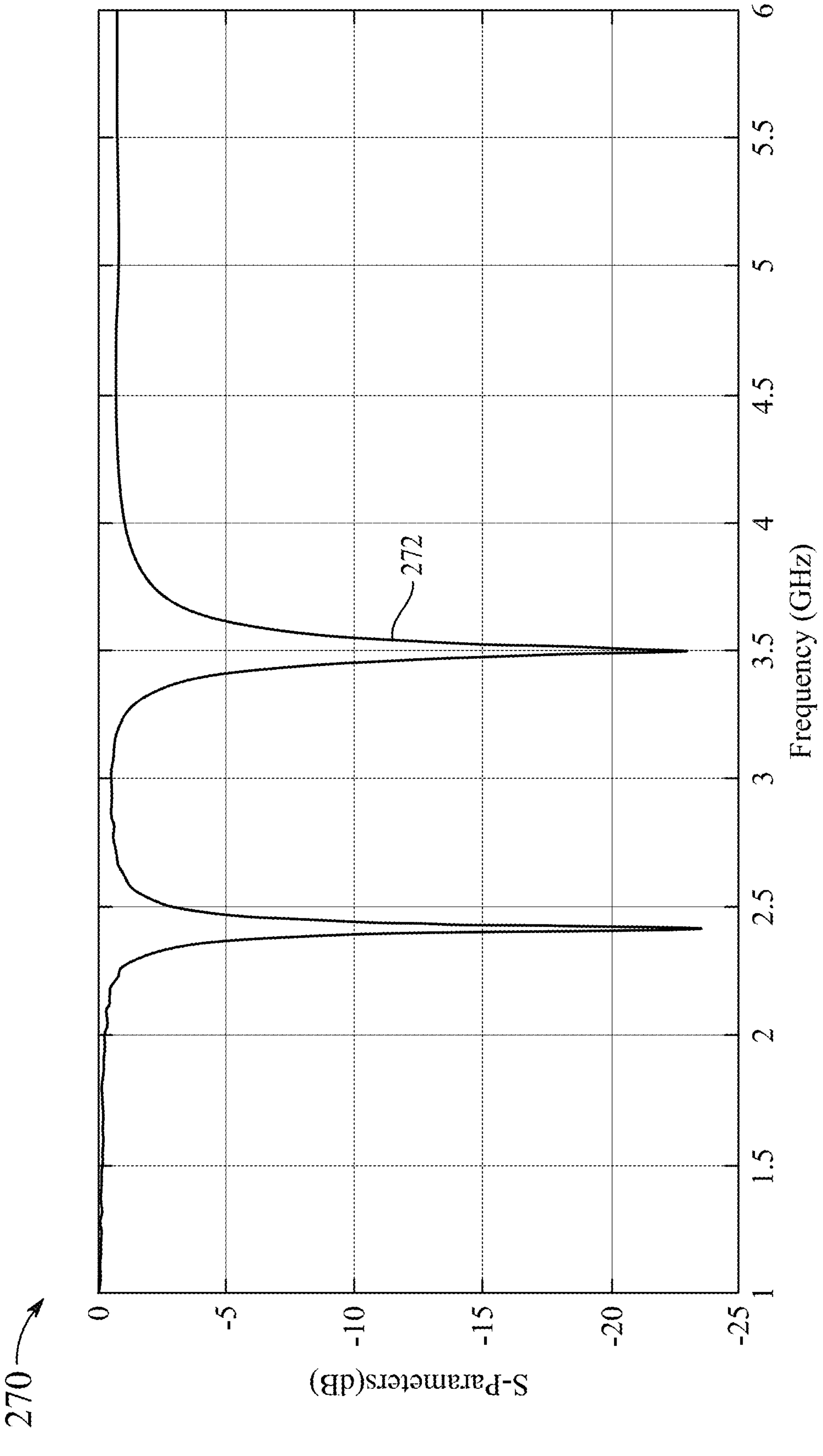
FIG. 2C is a graph of simulated reflection coefficient curves having s-parameters ($S_{11}$) for the single element dual band antenna, according to certain embodiments.

FIG. 2C is a graph 270 of simulated reflection coefficient (S-parameters) curves having s-parameters ($S_{11}$) for a single element dual band antenna 202. The S-parameters describe the input-output relationship between ports (or terminals) in an electrical system. Su represents a power that is reflected from the antenna, and hence is known as the reflection coefficient. If $S_{11}$=0 dB, then all the power is reflected from the antenna, and nothing is radiated. Curve 272 illustrates the s-parameters ($S_{11}$) for the single element dual band antenna 202. As shown in FIG. 2C, the antenna demonstrates sharp resonance notches at the exact frequencies of 2.4 GHz and 3.5 GHz, signalling exemplary impedance matching, a crucial aspect that affirms the antenna's efficiency and functionality in these dual bands. The MIMO antenna 100 employs small and simple yet highly efficient design of the antenna element, facilitating an easy fabrication process.

Figure 3A:
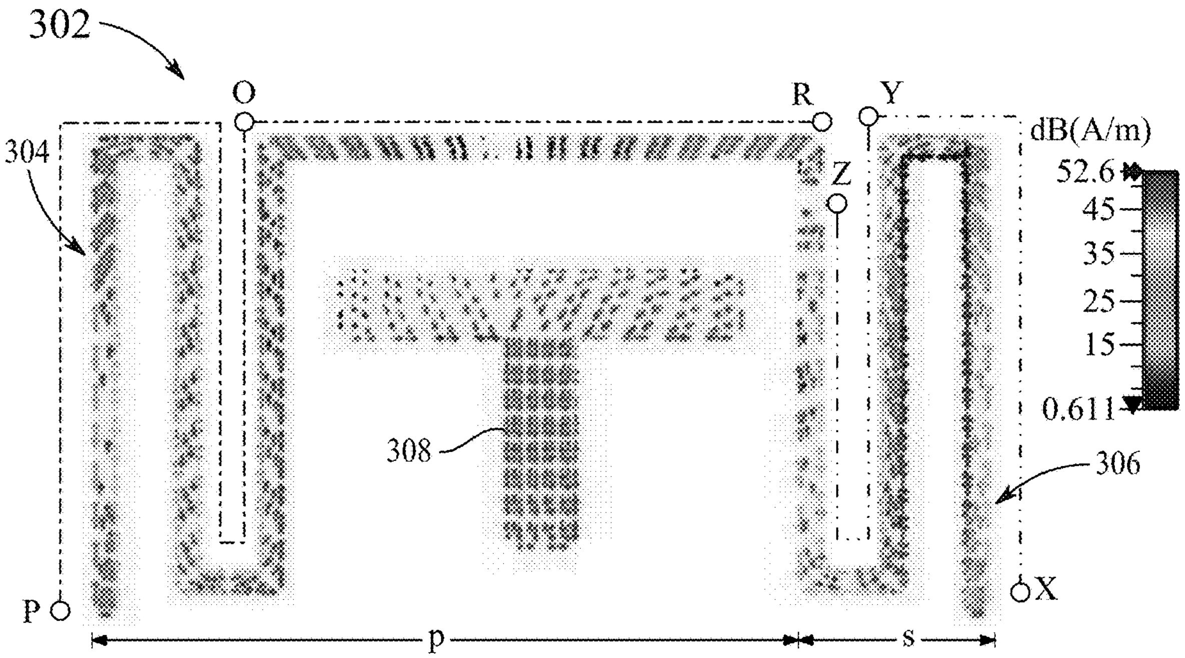
FIG. 3A illustrates surface current distribution of a single antenna element of the twelve element dual band antenna at a frequency of 3.5 GHZ, according to certain embodiments.

FIG. 3A illustrates surface current distribution of the single element dual band antenna 302 at a frequency of 3.5 GHz. It can be observed that the current distribution is greater at the second arm 306 of the antenna element dual band antenna at the 3.5 GHz frequency. It can be interpreted from the current distribution that the second arm 306 is radiating at the resonant frequency of 3.5 GHz. FIG. 3A affirms that the specific configuration of the second arm 206 results in determining and controlling the resonance at the frequency of 3.5 GHZ, effectively facilitating the antenna element dual band antenna 302 to tune into this higher frequency band.

Figure 3B:
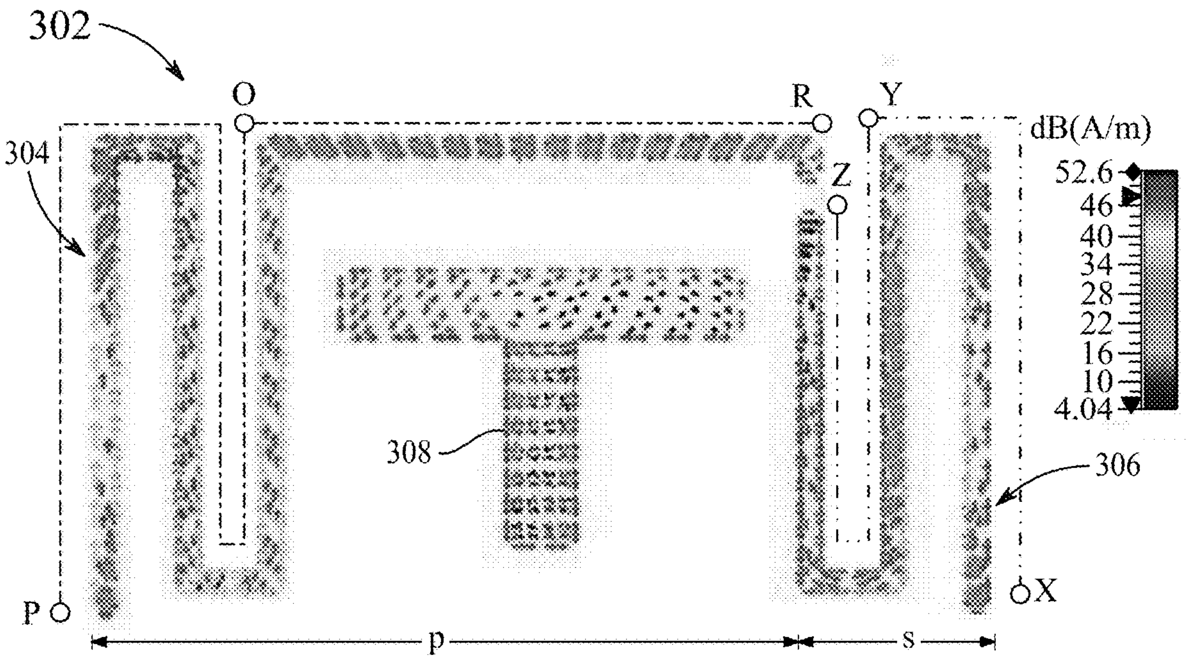
FIG. 3B illustrates surface current of a single antenna element of the twelve element dual band antenna at a frequency of 2.4 GHz, according to certain embodiments.

FIG. 3B illustrates the surface current distribution of the single element dual band antenna 302 at a frequency of 2.4 GHz. It can be observed that the current distribution is greater at the first arm 304 of the single element dual band antenna 302 at 2.4 GHz frequency. The first arm 204 is the resonating force driving the operation at 2.4 GHz frequency. It can be construed from the current distribution that first arm 304 is controlling the resonant frequency of 2.4 GHz.

An important aspect of the present disclosure is the independent variability in the lengths ('p' and 's') of the first arm and the second arm during a design phase. Varying lengths facilitate a distinct tuning mechanism for the dual resonant frequencies. Results of different lengths of antenna elements resonating at a dual brand frequency (3.5 GHz and 2.4 GHz) are shown in FIG. 4A and FIG. 4B, respectively.

Figure 4A:
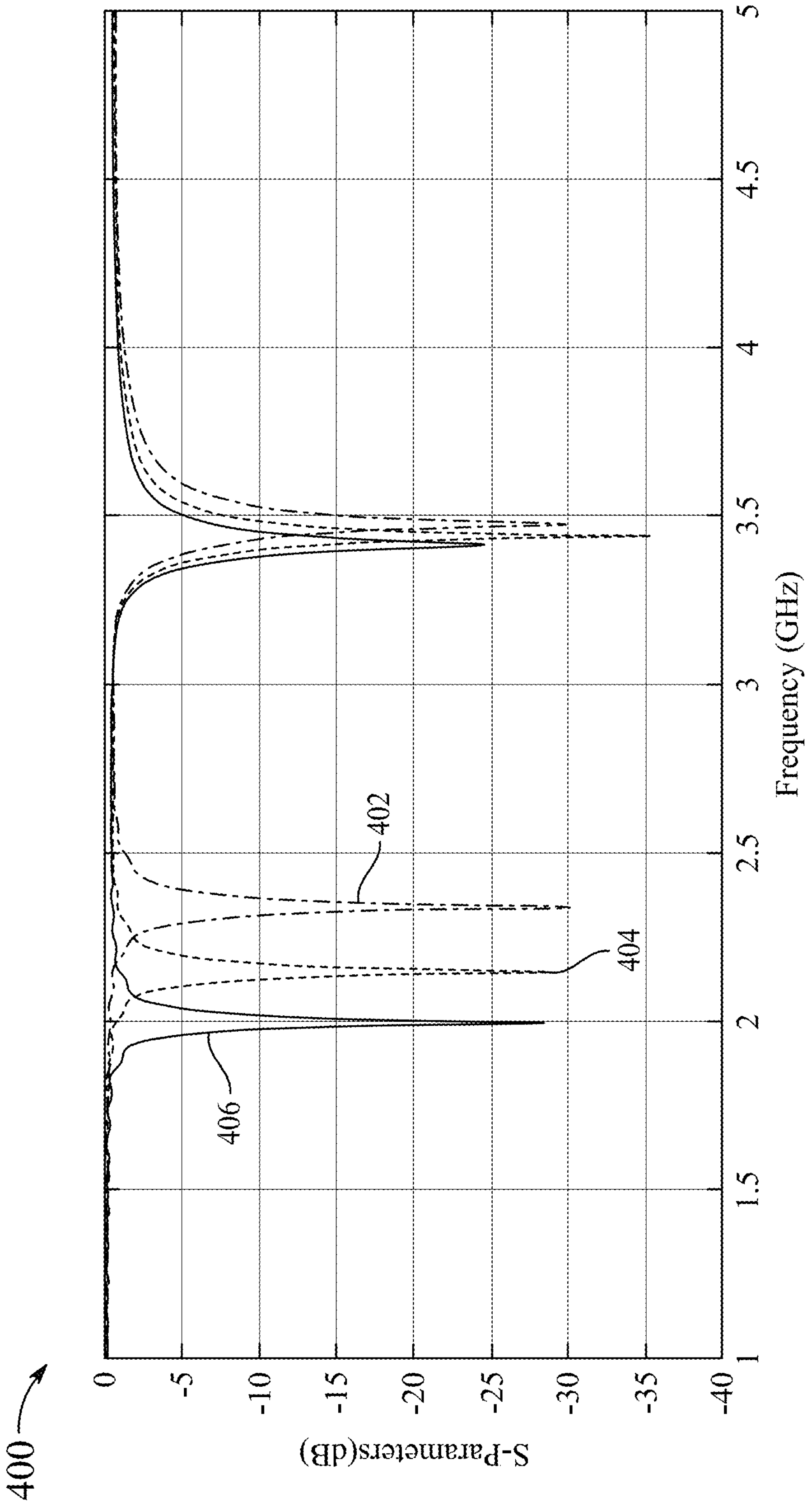
FIG. 4A is a graph of the simulated reflection coefficient curves having s-parameters versus frequency for variations in the length of a first arm of an antenna element, according to certain embodiments.

FIG. 4A is a graph 400 of the simulated reflection coefficient curves having s-parameters versus frequency for variations in the length ("p") of the first arm 204. FIG. 4A confirms that adjustments in the length of the first arm 204 affect the lower resonant frequency without influencing the higher frequency. The S-parameters represent the linear characteristics of RF electronic circuits and components. The MIMO antenna elements resonate at slightly different frequencies in accordance with their varying length of the first arm 204 in lower frequency range (2 GHZ-2.5 GHZ). Signal 402 represents the simulated reflection coefficient when the length of the first arm 204 was 9.4 mm. Signal 404 represents the simulated reflection coefficient when the length of the first arm 204 was 10.4 mm. Signal 406 represents the simulated reflection coefficient when the length of the first arm 204 was 11.4 mm. The single element dual band antenna 202 resonates at about 2.4 GHz, as depicted by the signal 402. When the length of the first arm 204 was 10.4 mm, the single element dual band antenna resonated at about 2.2 GHZ, as depicted by the signal 404. When the length of the first arm 204 was 11.4 mm, the single element dual band antenna 202 resonated at about 2 GHz, as depicted by the signal 406. However, the resonating frequency remains unaffected at higher frequency for any change in the length of the first arm 204. Therefore, from FIG. 4A, it is evident that varying the length of the first arm 204 can independently control lower resonant frequency without affecting the higher resonant frequency.

Figure 4B:
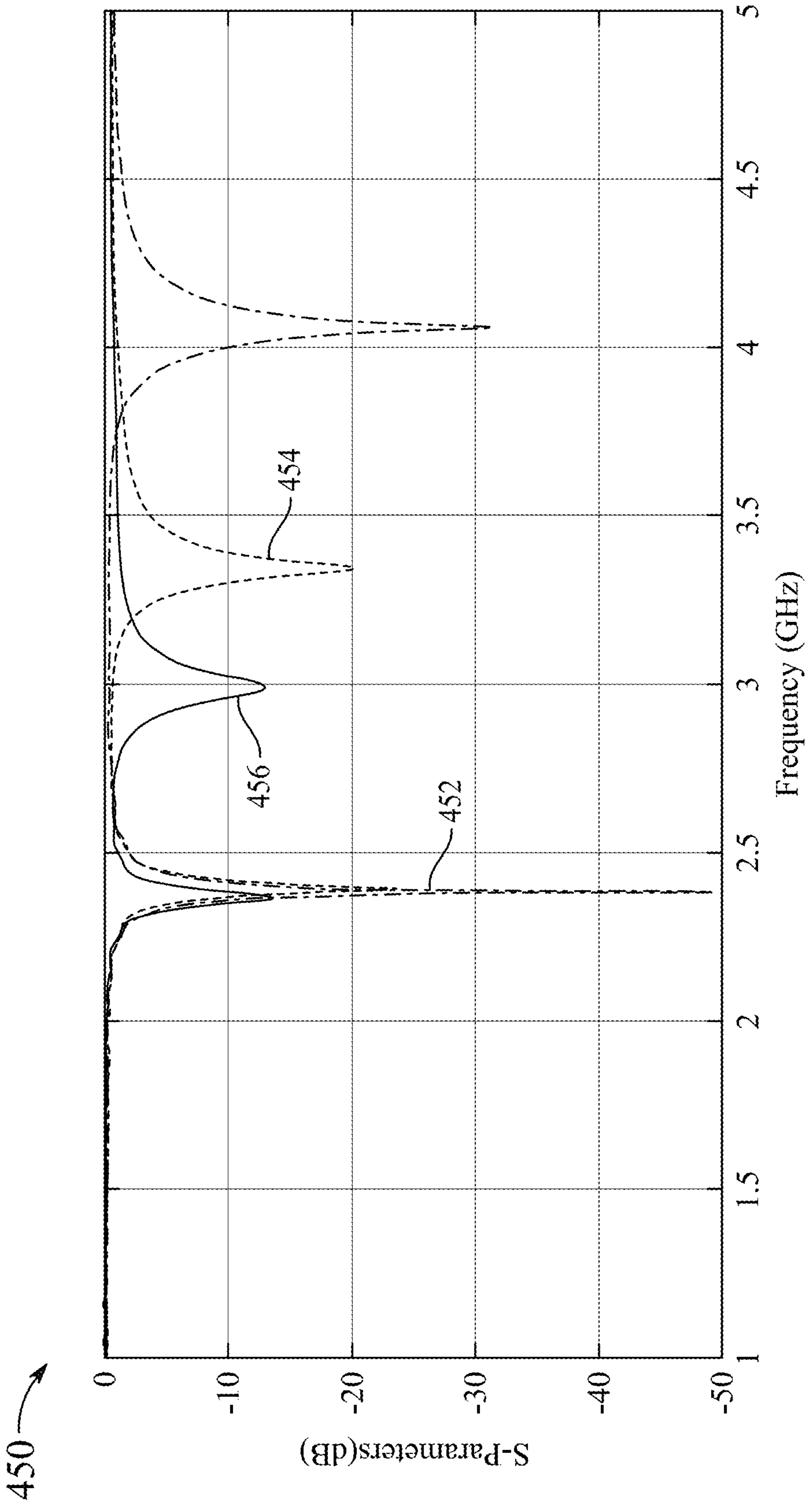
FIG. 4B is a graph of the simulated reflection coefficient curves having s-parameters versus frequency for variations in the length of the second arm of an antenna element, according to certain embodiments.

FIG. 4B is a graph 450 of the simulated reflection coefficient curves having s-parameters versus frequency for variations in the length ("s") of the second arm 206. FIG. 4B demonstrates that the adjustments in the length of the second arm 206 affect the higher resonant frequency without influencing the lower frequency. Signal 452 represents the simulated reflection coefficient when the length of the second arm 206 was 1.4 mm. Signal 454 represents the simulated reflection coefficient when the length of the second arm 206 was 2.4 mm. Signal 456 represents the simulated reflection coefficient when the length of the second arm 206 was 3.4 mm. In an example, when the length of the second arm 206 was 1.4 mm, the antenna element resonated at about 3 GHZ, as depicted by the signal 452. In an example, when the length of the second arm 206 was 2.4 mm, the antenna element resonated at about 3.4 GHz, as depicted by the signal 454. When the length of the second arm 206 was 3.4 mm, the antenna element resonated at about 4.10 GHz, as depicted by the signal 456. However, the resonating frequency remains unaffected at lower frequency for any variation in the length of the second arm 206. Therefore, from FIG. 4B, it is evident that varying the length of the second arm 206 can independently control higher resonant frequency without affecting the lower resonant frequency.

By adjusting the lengths of the first arm 204 and the second arm 206 of the single element dual band antenna (antenna element) 202, both arms can operate independently in tuning their respective frequency bands during the design phase. Thereby, the antenna element can be configured to effectively resonate at dual-band frequencies, such as 2.4 GHz and 3.5 GHz.

Figure 5A:
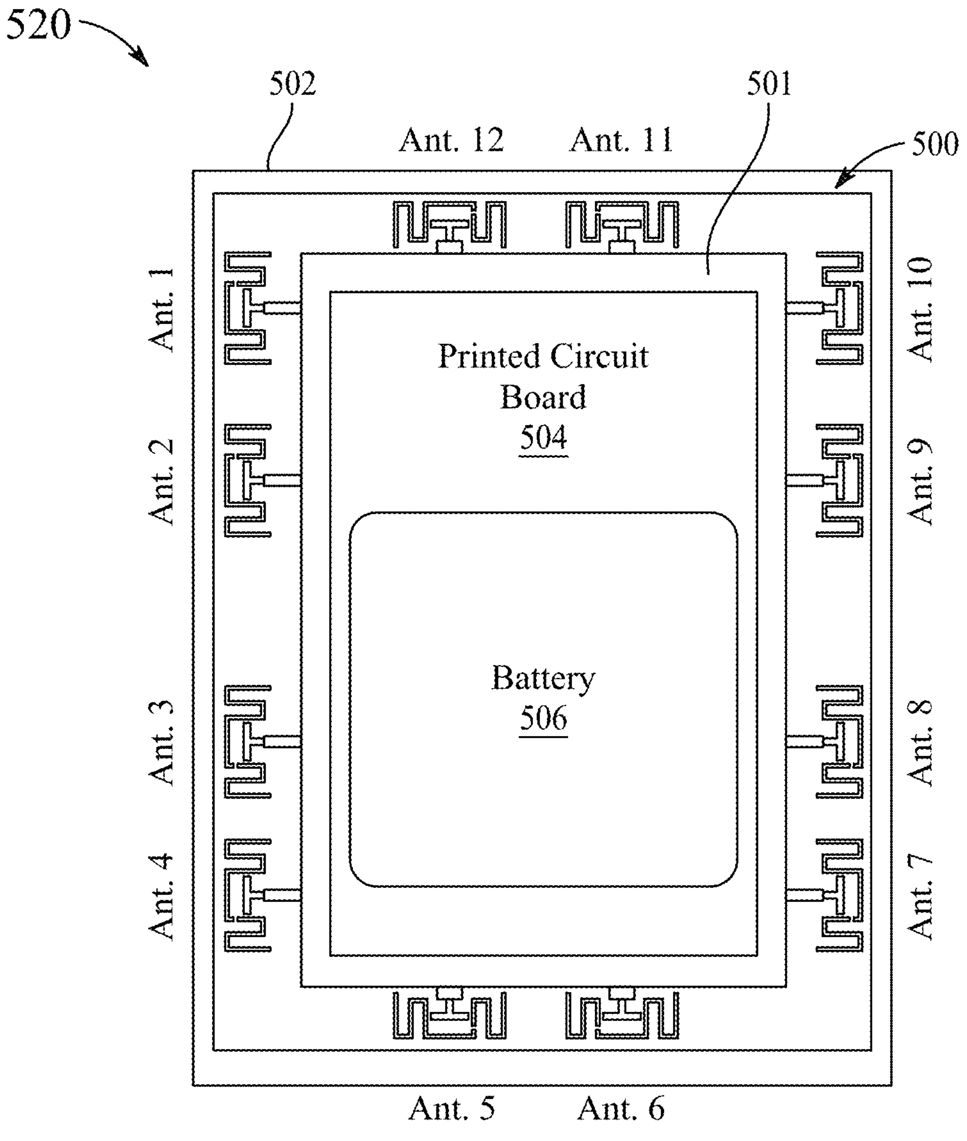
FIG. 5A illustrates an exemplary circuit diagram of the smartphone showing twelve antenna elements of the twelve element dual band MIMO antenna, according to certain embodiments.

FIG. 5A illustrates an exemplary circuit diagram of the smartphone 520 having the MIMO antenna 500. As shown in FIG. 5A, the smartphone 520 includes a smartphone housing 502, a printed circuit board 504, and a battery 506. The MIMO antenna 500 is located within the smartphone housing 502. The twelve antenna elements are implemented in the smartphone housing 502 of the smartphone 520. The twelve antenna elements are implemented using the printed circuit board 504. A substrate 501 is located within the smartphone housing 502. The substrate 501 includes a top side, a bottom side, a first side wall, a second side wall opposite the first side wall, a third side wall perpendicular to the first side wall and a fourth side wall opposite to the third side wall. The side walls are perpendicular to the substrate, therefore the antennas shown (Ant. 1 to Ant. 12) are oriented on an outer surface of the side walls and are also oriented perpendicular to the substrate which is not shown in perspective in FIG. 5A. The construction of the MIMO antenna 500 and the substrate 501 are substantially similar to the MIMO antenna 100 and the substrate 102, respectively, as disclosed in FIG. 1A, and thus the construction and operation are not repeated here in detail for the sake of brevity.

The MIMO antenna 100 is powered by the battery 506. The T-shaped feed structure of each single element antenna is fed by the VCC connection from the printed circuit board 504. In an aspect, each antenna element is configured to radiate at same time. As each of the antenna elements have different positions on each side of substrate 501, each antenna element has a different current distribution. The ground plane (copper layer on the substrate) acts as a reflector and a receptor of electromagnetic waves at the same time which will cause the pattern diversity between antenna elements.

Figure 5B:
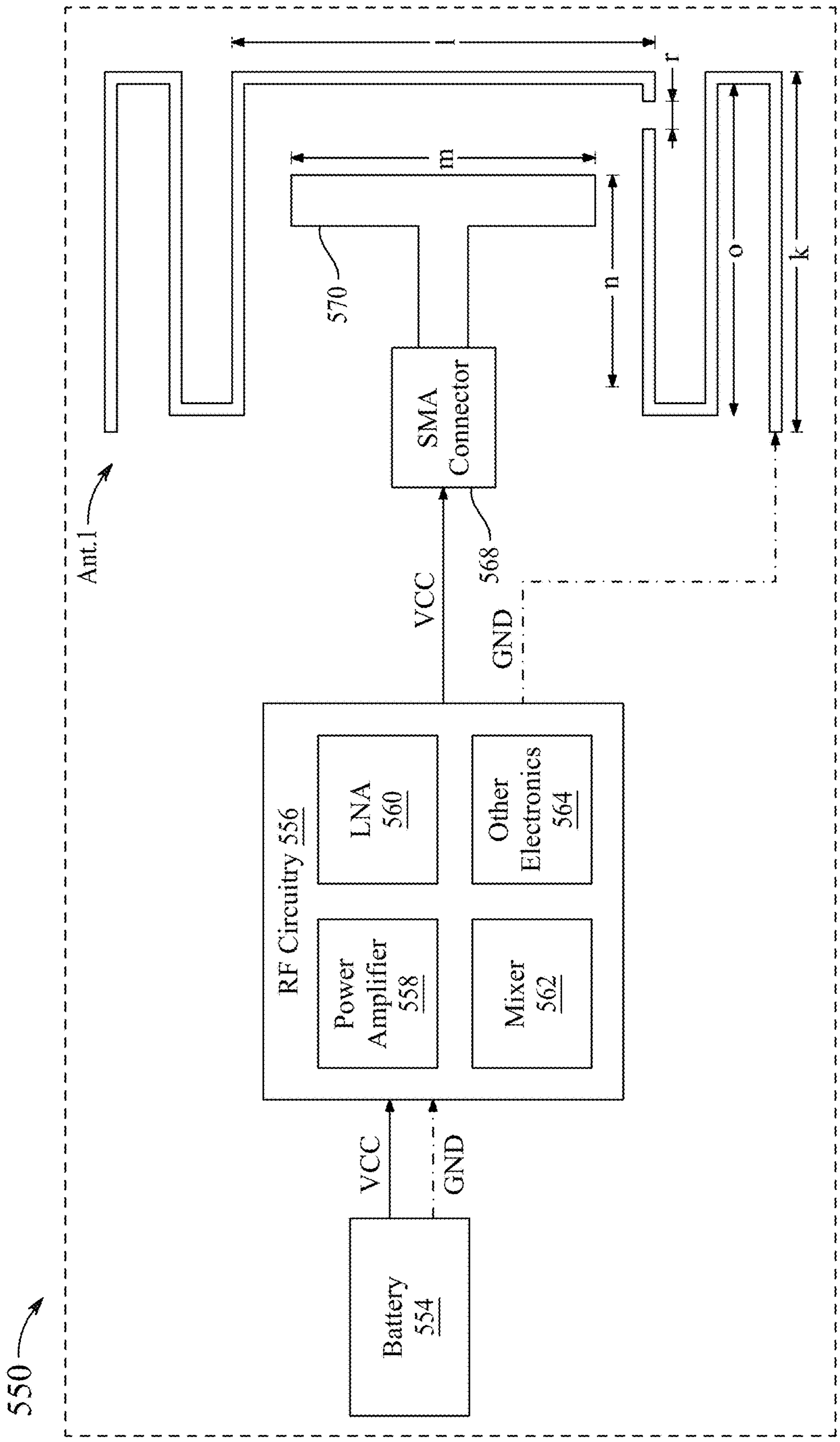
FIG. 5B illustrates a block diagram depicting connectivity of the twelve element dual band antenna with a smartphone, according to certain embodiments.

FIG. 5B illustrates a block diagram 550 depicting connectivity of the single element dual band antenna (ant.1) with the smartphone 520. As shown in FIG. 5B, the smartphone includes the housing 502 (as shown in FIG. 5A), the battery 554, a radio frequency (RF) circuitry 556, the single element antennas (ant.1), and a T-shaped feed structure 568. The battery 554 includes a battery ground terminal and a battery voltage terminal. The RF circuitry 556 is powered by the battery 554 of the smartphone 520. The RF circuitry 556 includes various components which include, but are not limited to, a power amplifier 558, a low noise amplifier (LNA) 560, a mixer 562, and other electronics 564. The RF circuitry 556 further includes an RF circuitry voltage output terminal and an RF circuitry ground terminal. The power amplifier 558 is connected to the battery ground terminal and the battery voltage terminal. The low noise amplifier 560 is connected to the power amplifier 558. The mixer 562 is operatively connected to the power amplifier 558 and the low noise amplifier 560.

The RF circuitry voltage output terminal (VCC) and the RF circuitry ground terminal of the RF circuitry 556 are connected to the single element antennas (ant.1). The VCC terminal is connected to the feed port 568 (SMA connector) of the T-shaped feed structure 570. The ground terminal is connected to the first leg of each arm of the radiating meandered slot line M1. Each antenna element of the twelve single element dual band antennas is connected to the RF circuitry ground terminal.

As shown in FIG. 5B, the T-shaped feed structure 570 is fed through the SMA connector 568, for example, 50Ω SMA connector, which is connected at the bottom side of the substrate 501 and powered by the battery 506. On the printed circuit board 504, each of the single element dual band antennas are ink jet printed in metallic ink on the outer surface of a respective side wall and each of the ten T-shaped feed structures are ink jet printed on an inner surface of a respective side wall.

From the RF circuitry 556, the RF circuitry voltage output terminal (VCC) and the RF circuitry ground terminal are connected to the MIMO antenna 500. In one aspect, the RF circuitry ground terminal is connected to first leg (A, G) of each arm of the radiating meandered spot line M1.

The RF circuitry 556 is configured to generate electrical signals and each antenna element of the MIMO antenna 100 is configured to radiate from the first arm at a resonant frequency of about 2.4 GHz and to radiate from the second arm 206 at a resonant frequency of about 3.5 GHz in response to the electrical signals received at its respective feed port.

Figure 6A:
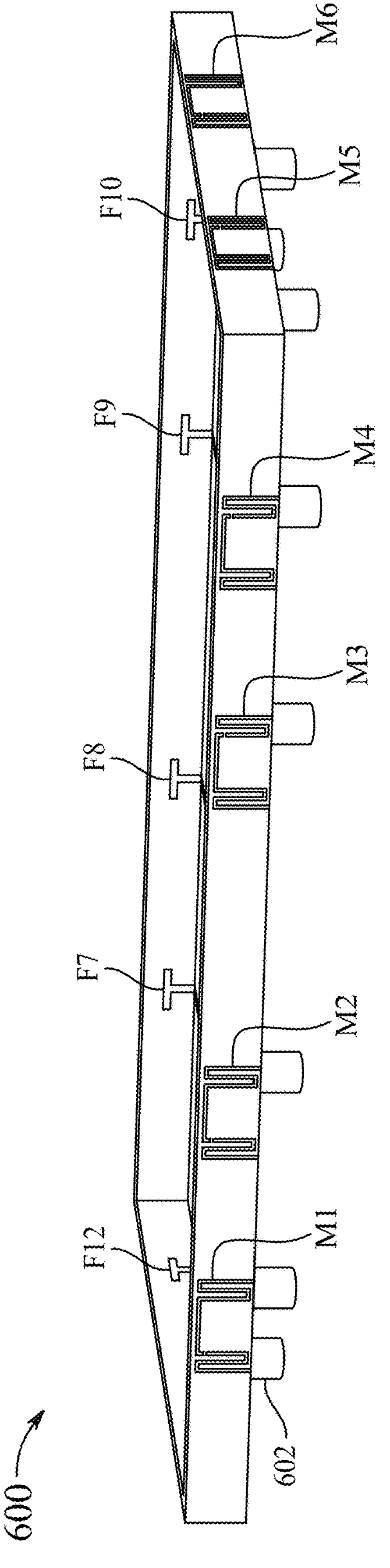
FIG. 6A is an exemplary side view of the substrate, according to certain embodiments.
Figure 6B:
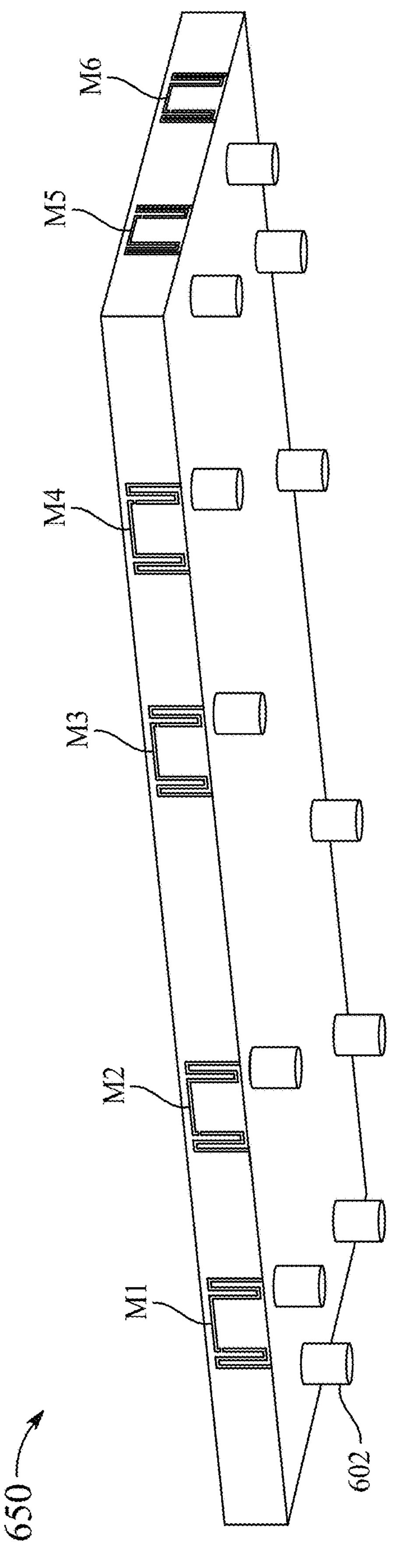
FIG. 6B is an exemplary bottom view of the substrate, according to certain embodiments.

FIG. 6A is a side view 600 of the substrate 102. FIG. 6B is a bottom view 650 of the substrate 102. As shown, a plurality of 50 $2 SMA connectors 602 is connected to the outside surface of the bottom side 106 of the substrate 102. Each of the plurality of 50 $2 SMA connectors 602 is connected to the T-shaped feeding structure 208.

Figure 7:
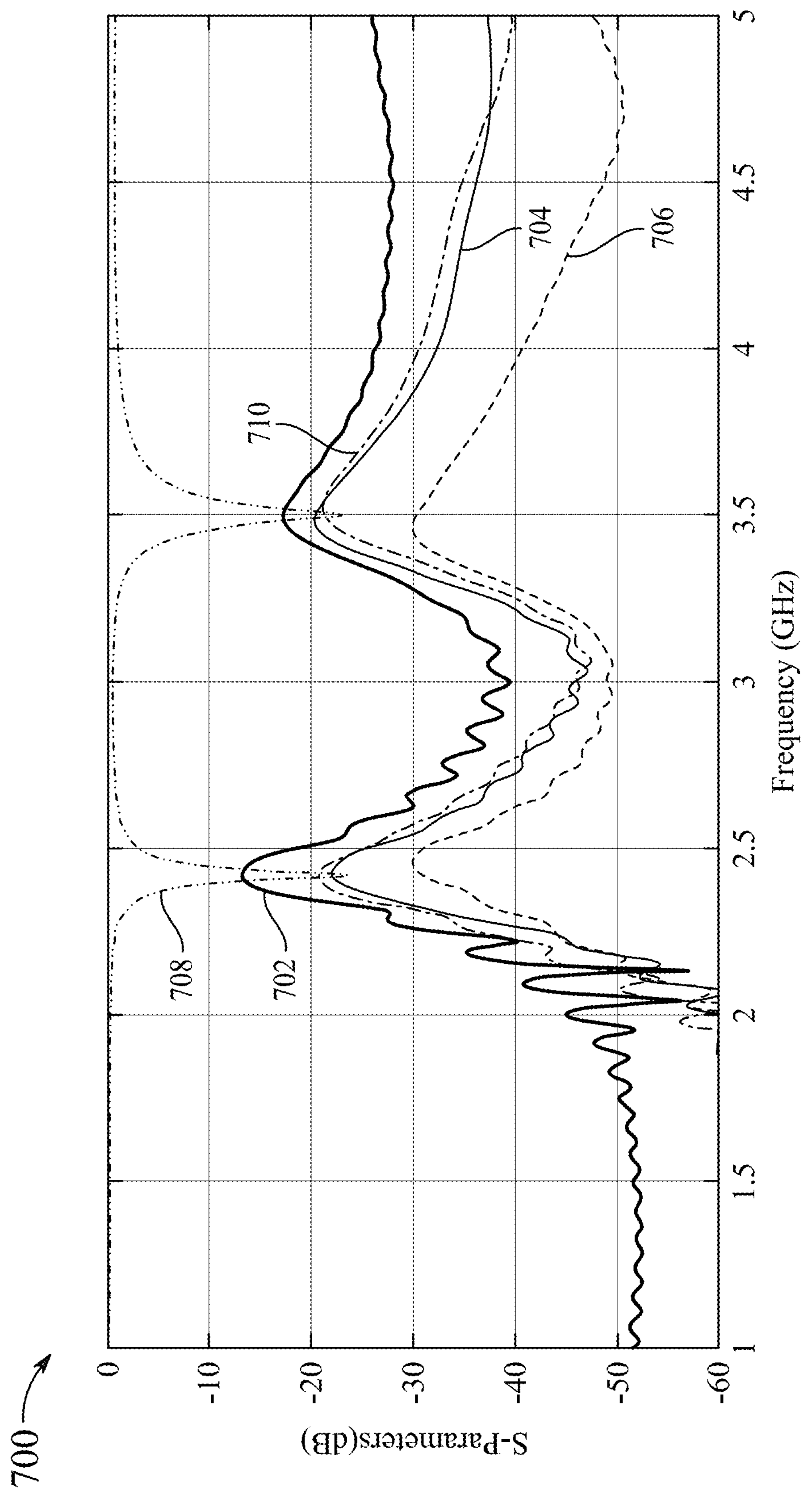
FIG. 7 illustrates the various scattering(S)-parameter curves for the twelve element dual band MIMO antenna, according to certain embodiments.

FIG. 7 is a graph 700 illustrating various scattering(S)-parameters curves for the MIMO antenna 100. Signal 702 represents the simulated values of the $S_{12}$. Signal 704 represents the simulated values of the $S_{13}$. Signal 706 represents the simulated values of the $S_{14}$. Signal 708 represents the simulated values of the $S_{22}$. Signal 710 represents the simulated values of the $S_{24}$. FIG. 7 shows that the MIMO antenna is resonating at 2.4 and 3.5 GHz with isolation better than 13.4 dB.

Figure 8:
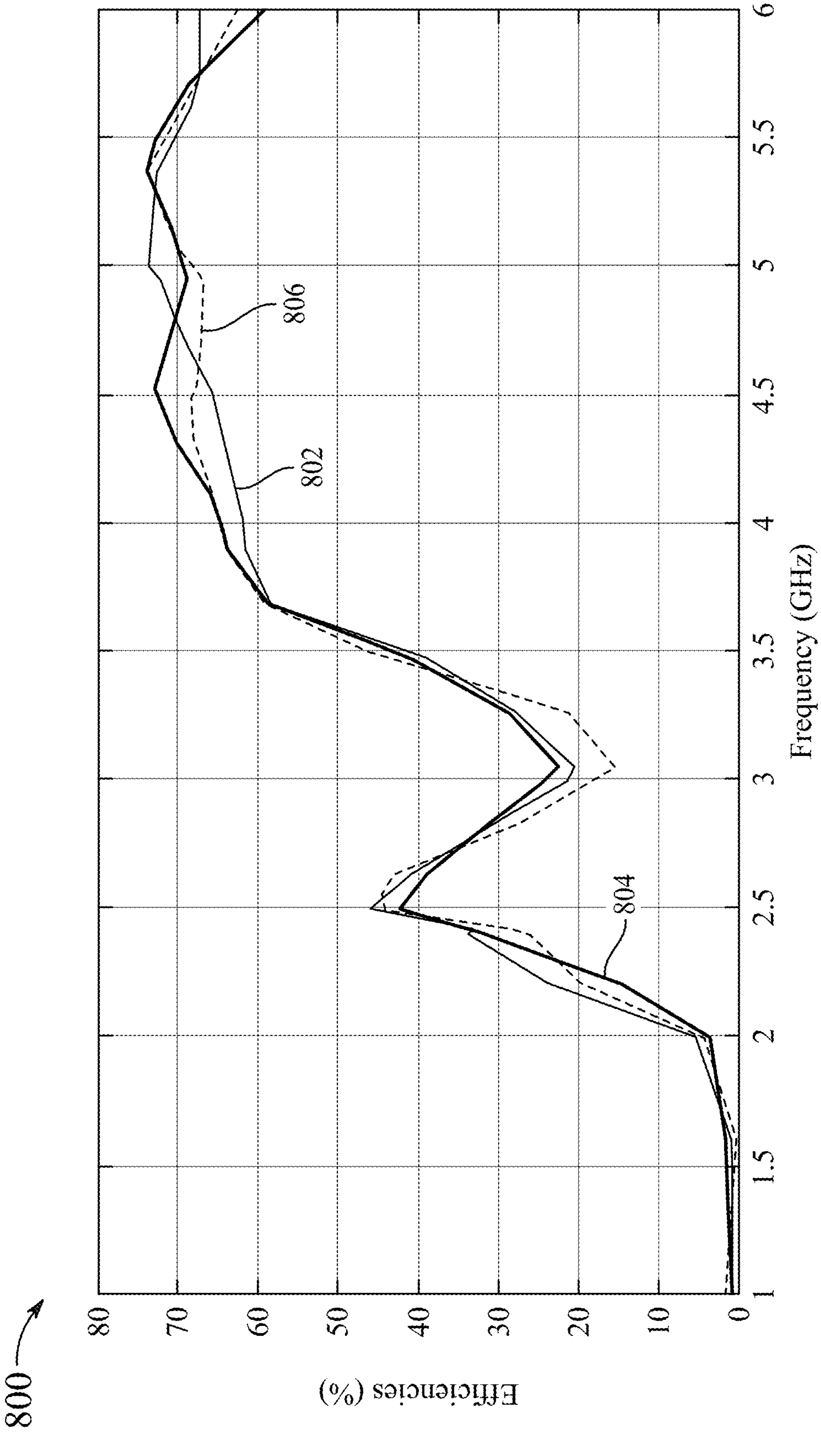
FIG. 8 is a graph representing radiation efficiency for various antennas, according to certain embodiments.

FIG. 8 is a graph 800 representing radiation efficiency for various antennas. Curve 802 represents the efficiency for the second antenna. Curve 804 represents the efficiency for the first antenna and the third antenna, which merge due to the symmetry about the second antenna. Curve 806 represents the efficiency for the fourth antenna.

Figure 9A:
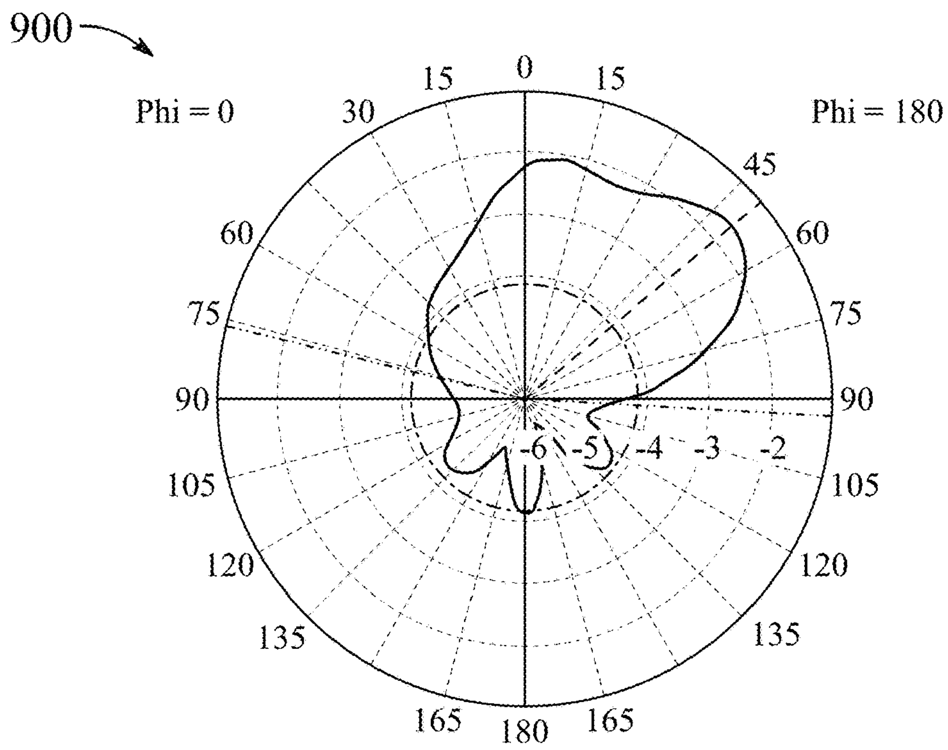
FIG. 9A is a two-dimensional (2D) representation of the radiation patterns of the antenna 1 at 2.4 GHz when Phi=0 and Phi=180, according to certain embodiments.
Figure 9B:
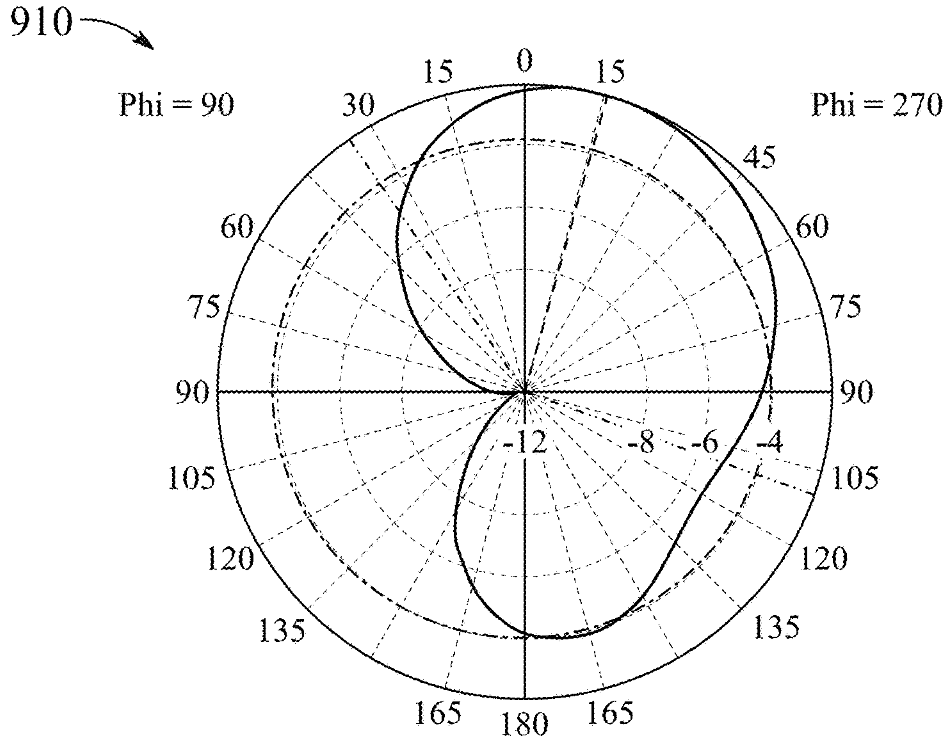
FIG. 9B is a 2D representation of the radiation patterns of the antenna 1 at 2.4 GHz when Phi=90 and Phi=270, according to certain embodiments.
Figure 9C:
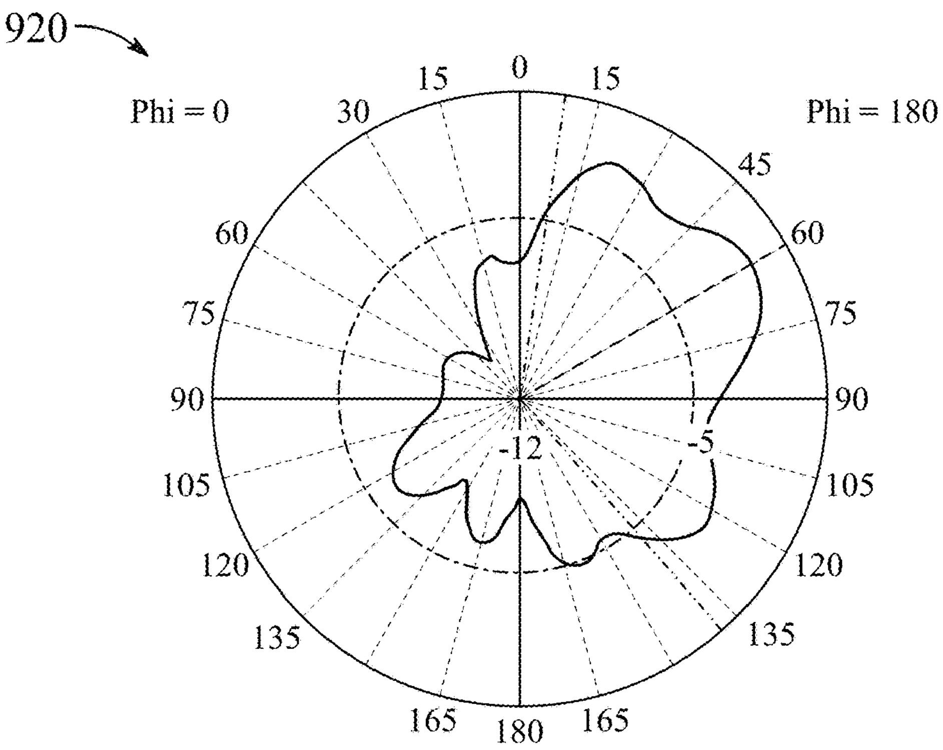
FIG. 9C is a 2D representation of the radiation patterns of the antenna 1 at 3.5 GHz when Phi=0 and Phi=180, according to certain embodiments.
Figure 9D:
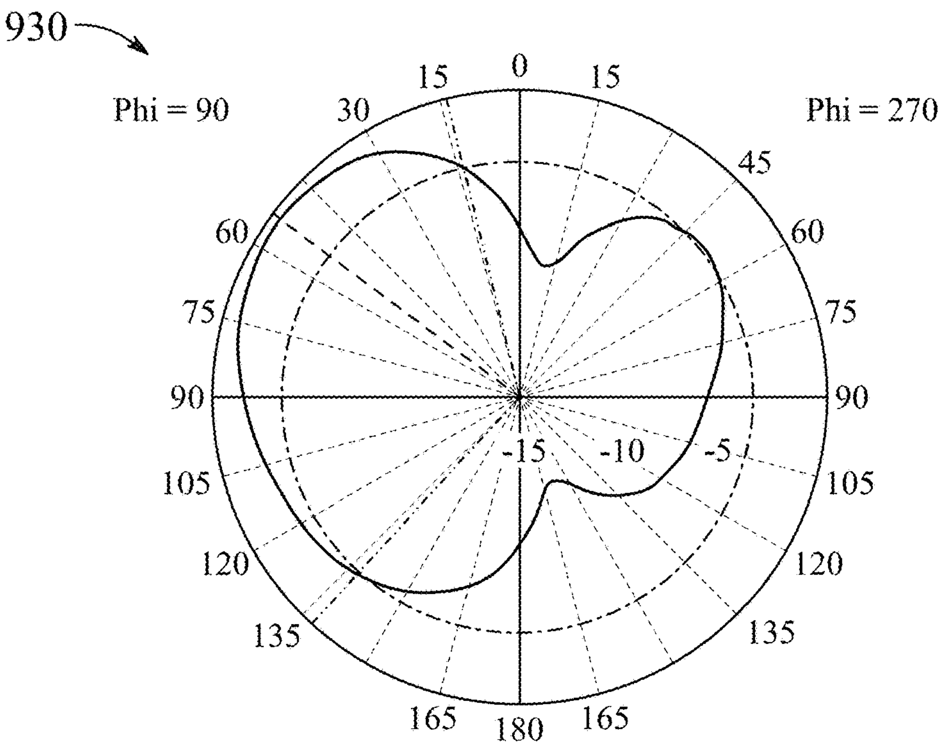
FIG. 9D is a 2D representation of the radiation patterns of the antenna 1 at 3.5 GHz when Phi=90 and Phi=270, according to certain embodiments.

FIG. 9A is a two-dimensional (2D) representation 900 of the radiation patterns of antenna 1 at 2.4 GHz when Phi=0 and Phi=180. FIG. 9B is a 2D representation 910 of the radiation patterns of antenna 1 at 2.4 GHz when Phi=90 and Phi=270. FIG. 9C is a 2D representation 920 of the radiation patterns of antenna 1 at 3.5 GHz when Phi=0 and Phi=180. FIG. 9D is a 2D representation 930 of the radiation patterns of antenna 1 at 3.5 GHz when Phi=90 and Phi=270.

For antenna(s) for transmitting simultaneous and independent data streams, isolation is required between the antenna(s) such that each antenna works independently without affecting other antenna performance. The antennas should have good isolation, and their radiation patterns should not be same, or at least not be very "correlated". To measure the isolation between the antennas, an envelope correlation coefficient (ECC) is calculated.

The ECC gives a measure of the independence the radiation patterns between two antennas. For example, if one antenna is completely horizontally polarized, and the other is completely vertically polarized, then the two antennas would have an ECC of zero. In similar manner, if one antenna radiated energy towards the sky, and the other only radiated energy towards the ground, these antennas would also have an ECC of 0. The ECC is considered to be an important factor in assessing the antenna's radiation pattern shape, polarization, and a relative phase of the fields between the two antennas. During experiments, the values were found to be very low, less than 0.05, which is ideal for the MIMO operation.

Figure 10:
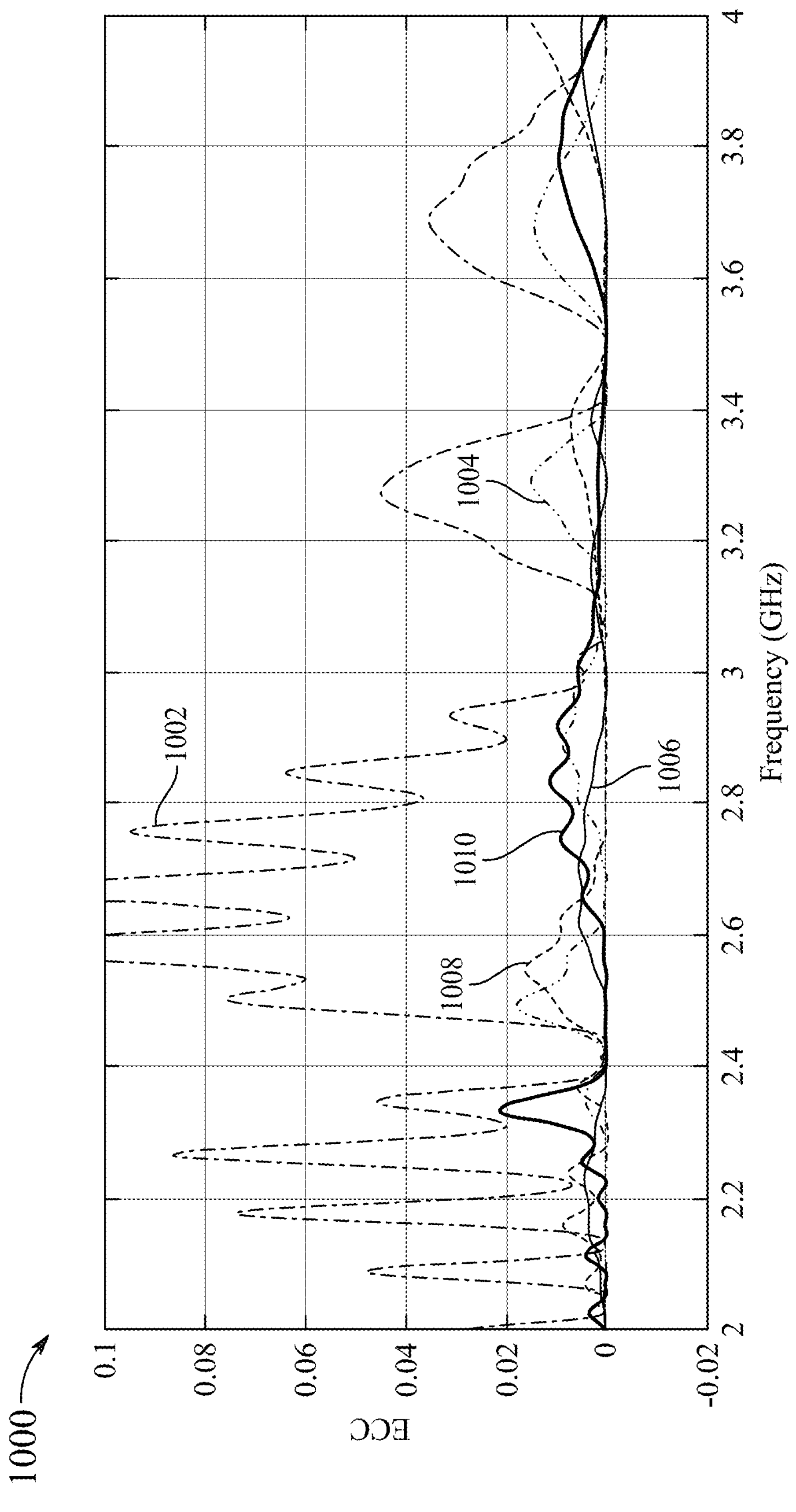
FIG. 10 is a graph showing an envelope correlation coefficient for different antenna elements, according to certain embodiments.

FIG. 10 is a graph 1000 showing the envelope correlation coefficient for different antenna elements. Curve 1002 represents the ECC values for the antenna 1. Curve 1004 represents the ECC values the antenna 2. Curve 1006 represents the ECC values for the antenna 3. Curve 1008 represents the ECC values for the antenna 4. Curve 1010 represents the ECC values for the antenna 5.

The performance of the present MIMO antenna 100 is compared with the aforementioned existing antennas and is summarized in Table 2. It is observed from the Table 2 that the present MIMO antenna 100 is efficient in comparison to conventional antennas.

TABLE 2

Summary of performance comparison

| References | Operating Bands in GHz | Total Efficiencies | Element numbers | Isolation | ECC |
|---|---|---|---|---|---|
| S. H. Kiani et al. | 3.34-3.7<br>4.67-5.08 | 55%<br>72% | 8 | >12 dB | <0.08 |
| S.-C. Chen et al. | 3.4-3.8<br>4.8-5 | Above 42% | 4 | >10 dB | <0.27 |
| D. Serghiou et al. | 3.1-3.8<br>4.8-6 | Above 60% | 8 | >10 dB | <0.06 |
| W. Hu et al. | 3.3-3.6<br>4.8-5 | 45-78%<br>47-65% | 10 | >12 dB | <0.15 |
| H. Zou et al. | 3.4-3.6<br>5.15-5.925 | 53-56%<br>53-65% | 8 | >12 dB | <0.1 |
| The MIMO antenna 100 | 2.3-2.45<br>3.4-3.6 | 33%<br>43% | 12 | >13.5 dB | <0.05 |

Each antenna element with a slit is responsible for dual band characteristics. Each antenna element is separately fed by the T-shaped feeding structure. The MIMO antenna 100 achieves greater than 60% radiation efficiency with isolation greater than 13.47 dB. The reflection coefficients of the MIMO antenna are less than-17 dB in both frequency bands.

The first embodiment is illustrated with respect to FIG. 1A-FIG. 10. The first embodiment describes the twelve element dual band multiple-input multiple-output (MIMO) antenna 100 for a smartphone 520. The MIMO antenna 100 includes a substrate 102, twelve single element dual band antennas and each single element dual band antenna having a meandered slot line, twelve T-shaped feed structures, and a ground plane.

The substrate 102 has a top side 104, a bottom side 106, a first side wall 108, a second side wall 110 opposite the first side wall 108, a third side wall perpendicular to the first side wall 108 and a fourth side wall 114 opposite to the third side wall.

The MIMO antenna 100 includes twelve single element dual band antennas. A first four of the single element dual band antennas are spaced along an outer surface of the first side wall 108, a second four of the single element dual band antennas are spaced along an outer surface of the second side wall 110, a ninth and tenth of the single element dual band antennas are spaced along an outer surface of the third side wall, and an eleventh and twelfth of the single element dual band antennas are spaced along an outer surface of the fourth side wall 114. Each single element dual band antenna includes a meandered slot line having a first arm 204 and a second arm 206. The first arm 204 is separated from the second arm 206 by a slit 210.

The MIMO antenna 100 includes twelve T-shaped feed structures. A first set of four of the T-shaped feed structures are located on an inner surface of the first side wall 108. Each of the first set of four T-shaped feed structures is located directly behind and centered with a single element dual band antenna located on the outer surface of the first side wall 108.

A second set of four of the T-shaped feed structures are located on an inner surface of the second side wall 110. Each of the second set of four T-shaped feed structures is located directly behind and centered with a single element dual band antenna located on the outer surface of the second side wall 110.

A third set of two T-shaped feed structures are located on an inner surface of the third side wall. Each of the third set of two T-shaped feed structures is located directly behind and centered with a single element dual band antenna located on the outer surface of the third side wall.

A fourth set of two T-shaped feed structures are located on an inner surface of the fourth side wall 114. Each of the fourth set of two T-shaped feed structures is located directly behind and centered with a single element dual band antenna located on the outer surface of the fourth side wall 114.

Each T-shaped feed structure is connected through to a feed port located on the bottom side 106 of the substrate 102.

A ground plane is located on the bottom side 106 of the substrate 102. The first arm 204 and the second arm 206 are connected to the ground plane.

Each antenna of the twelve element dual band MIMO antenna is configured to radiate from the first arm 204 at a frequency of about 2.4 GHz and to radiate from the second arm 206 at a frequency of about 3.5 GHz in response to an electrical signal applied to its respective feed port.

In an aspect of the present disclosure, the first arm 204 includes a first leg A perpendicular to the bottom side 106. A first end of the first leg A is connected to the ground plane and a second end of the first leg A is located near an upper end of a respective side wall. A second leg B has a first end connected to a second end of the first leg A. The second leg B is perpendicular to the first leg A and the second leg B is configured to extend towards the second arm 206. A third leg C has a first end connected to a second end of the second leg B. The third leg C is perpendicular to the second leg B. The third leg C is configured to extend towards the bottom side 106. A fourth leg D has a first end connected to a second end of the third leg C. The fourth leg D is parallel to the bottom side 106 and is configured to extend towards the second arm 206. A fifth leg E has a first end connected to a second end of the fourth leg D. The fifth leg E is perpendicular to the fourth leg D. The fifth leg E is configured to extend from the bottom side 106 towards the upper end of the respective side wall. A sixth leg F is connected to and perpendicular to the fifth leg E. The sixth leg F extends towards second arm 206 and ends at the slit.

In one aspect, the first leg A has a length of about 5.98 mm, the second leg B has a length of about 0.85 mm, the third leg C has a length of about 5.5 mm, the fourth leg D has a length of about 0.85 mm, the fifth leg E has a length of about 5.5 mm, the sixth leg F has a length of about 7 mm, and a width of the meandered slot line of each of the first leg A, the second leg B, the third leg C, the fourth leg D, the fifth leg E and the sixth leg F is about 0.2 mm.

The second arm 206 includes a first leg G perpendicular to the bottom side 106. A first end of the first leg G is connected to the ground plane and a second end of the first leg G is located near an upper end of a respective side wall. A second leg H having a first end connected to a second end of the first leg G. The second leg H is perpendicular to the first leg G and the second leg H is configured to extend towards the first arm 204. A third leg I has a first end connected to a second end of the second leg H. The third leg I is perpendicular to the second leg H and is configured to extend towards the bottom side 106. A fourth leg J has a first end connected to a second end of the third leg I. The fourth leg J is parallel to the bottom side 106 and is configured to extend towards the first arm 204. A fifth leg K having a first end connected to a second end of the fourth leg J. The fifth leg K is perpendicular to the fourth leg J and is configured to extend from the bottom side 106 towards the slit 210.

In one aspect, the first leg G has a length of about 5.98 mm, the second leg H has a length of about 0.85 mm, the third leg I has a length of about 5.5 mm, the fourth leg J has a length of about 0.85 mm, the fifth leg K has a length of about 5.0 mm, the slit 210 is about 0.45 mm, and a width of the meandered slot line of each of the first leg G, the second leg H, the third leg I, the fourth leg J, and the fifth leg K is about 0.2 mm.

In one aspect, the substrate 102 has length, width and thickness dimensions of about 150 mm×about 75 mm× about 0.8 mm respectively.

In one aspect, each single element dual band antenna has length, height and thickness dimensions of about 11.20 mm×about 5.98 mm× about 0.02 mm, respectively.

In one aspect, the first side wall 108 and the second side wall 110 each have length, height and thickness dimensions of about 150 mm×about 6.8 mm×about 0.8 mm respectively, and the third side wall and the fourth side wall 114 each have length, height and thickness dimensions of about 75 mm×about 6 mm×about 0.8 mm respectively.

In one aspect, a width of the first arm 204 is about 9.1 mm, and a width of the second arm 206 is about 2.1 mm.

In one aspect, the twelve single element dual band antennas are spaced along their respective side walls such that a first single element dual band antenna is spaced at a distance of about 20.02 mm from a first end of the outer surface of the first side wall 108, a second single element dual band antenna is spaced at a distance of about 19.3 mm from the first single element dual band antenna, a third single element dual band antenna is spaced at a distance of about 39.4 mm from the second single element dual band antenna, a fourth single element dual band antenna is spaced at a distance of about 19.3 mm from the third single element dual band antenna and at a distance of about 20.02 mm from a second end of the first side wall 108, a fifth single element dual band antenna is spaced at a distance of about 15.3 mm from a first end of the outer surface of the third side wall, a sixth single element dual band antenna is spaced at a distance of about 22 mm from the fifth single element dual band antenna and at a distance of about 15.3 mm from a second end of the outer surface of the third side wall, a seventh single element dual band antenna is spaced at a distance of about 20.02 mm from a first end of the outer surface of the second side wall, an eighth single element dual band antenna is spaced at a distance of about 19.3 mm from the seventh single element dual band antenna, a ninth single element dual band antenna is spaced at a distance of about 39.4 mm from the eighth single element dual band antenna, a tenth single element dual band antenna is spaced at a distance of about 19.3 mm from the ninth single element dual band antenna and at a distance of about 20.02 mm from a second end of the second side wall, an eleventh single element dual band antenna is spaced at a distance of about 15.3 mm from a first end of the outer surface of the fourth side wall 114. A twelfth single element dual band antenna is spaced at a distance of about 22 mm from the eleventh single element dual band antenna and at a distance of about 15.3 mm from a second end of the outer surface of the fourth side wall 114.

In one aspect, a height of each T-shaped feed structure is about 4.25 mm, and a width of the T of the T-shape is about 5.0 mm.

In one aspect, each feed port is connected to a 50Ω SMA connector.

The second embodiment is illustrated with respect to FIG. 1A-FIG. 10. The second embodiment describes a smartphone 520 having a twelve element dual band multiple-input multiple-output (MIMO) antenna 100. The smartphone includes a smartphone housing, a battery, a radio frequency (RF) circuit, twelve element dual band MIMO antennas (antenna 1-antenna 12), and twelve T-shaped feed structures (F1-F12).

The battery includes a battery ground terminal and a battery voltage terminal. The battery is located within the smartphone housing 502.

The radio frequency (RF) circuit is located within smartphone housing. The RF circuit includes, but is not limited to, a power amplifier connected to the battery ground terminal and the battery voltage terminal, a low noise amplifier connected to the power amplifier, a mixer operatively connected to the power amplifier and the low noise amplifier, an RF circuit voltage terminal, and an RF circuit ground terminal.

In one aspect, the twelve element dual band MIMO antenna is located within the smartphone housing. The twelve element dual band MIMO antenna is configured as twelve single element dual band antennas. Each antenna of the twelve single element dual band antennas is connected to the RF circuit ground terminal. Each single element dual band antenna includes a meandered slot line having a first arm 204 and a second arm 206. The first arm 204 is separated from the second arm 206 by a slit 210.

Each of the twelve T-shaped feed structures is connected to a feed port. Each feed port is connected to the RF circuitry voltage output terminal.

In one aspect, the RF circuit is configured to generate electrical signals and each antenna of the twelve element dual band MIMO antenna is configured to radiate from the first arm 204 at a resonant frequency of about 2.4 GHz and to radiate from the second arm 206 at a resonant frequency of about 3.5 GHz in response to the electrical signals received at its respective feed port.

A substrate 102 is located in the smartphone housing. The substrate 102 includes a top side 104, a bottom side 106, a first side wall 108, a second side wall 110 opposite the first side wall 108, a third side wall perpendicular to the first side wall 108 and a fourth side wall 114 opposite to the third side wall.

The twelve single element dual band antennas are arranged along the outer surface of the first side wall 108, the second side wall 110, the third side wall and the fourth side wall 114. In such arrangement, a first four of the single element dual band antennas are spaced along an outer surface of the first side wall 108, a second four of the single element dual band antennas are spaced along an outer surface of the second side wall 110, ninth and tenth of the single element dual band antennas are spaced along an outer surface of the third side wall, and eleventh and twelfth of the single element dual band antennas are spaced along an outer surface of the fourth side wall 114.

A first set of four of the T-shaped feed structures is located on an inner surface of the first side wall 108. Each of the first set of four T-shaped feed structures is located directly behind and centered with a single element dual band antenna located on the outer surface of the first side wall 108.

A second set of four of the T-shaped feed structures is located on an inner surface of the second side wall 110. Each of the second set of four T-shaped feed structures is located directly behind and centered with a single element dual band antenna located on the outer surface of the second side wall 110.

A third set of two T-shaped feed structures is located on an inner surface of the third side wall. Each of the third set of two T-shaped feed structures is located directly behind and centered with a single element dual band antenna located on the outer surface of the third side wall.

A fourth set of two T-shaped feed structures is located on an inner surface of the fourth side wall 114. Each of the fourth set of two T-shaped feed structures is located directly behind and centered with a single element dual band antenna located on the outer surface of the fourth side wall 114.

The feed port is located on the bottom side 106 of the substrate 102.

A ground plane located on the bottom side 106 of the substrate 102. The first arm 204 and the second arm 206 are connected to the ground plane.

The first arm 204 includes a first leg A perpendicular to the bottom side. A first end of the first leg A is connected to the ground plane and a second end of the first leg is located near an upper end of a respective side wall. A second leg B has a first end connected to a second end of the first leg A. The second leg B is perpendicular to the first leg A and the second leg B is configured to extend towards the second arm 206. A third leg C has a first end connected to a second end of the second leg B. The third leg C is perpendicular to the second leg B and is configured to extend towards the bottom side 106. A fourth leg D has a first end connected to a second end of the third leg C. The fourth leg D is parallel to the bottom side 106 and is configured to extend towards the second arm 206. A fifth leg E has a first end connected to a second end of the fourth leg D. The fifth leg E is perpendicular to the fourth leg D and is configured to extend from the bottom side 106 towards the upper end of the respective side wall. A sixth leg F is connected to and perpendicular to the fifth leg E. The sixth leg F extends towards second arm 206 and ends at the slit 210.

The second arm 206 includes a first leg G perpendicular to the bottom side 106. A first end of the first leg G is connected to the ground plane and a second end of the first leg G is located near an upper end of a respective side wall. A second leg H has a first end connected to a second end of the first leg G. The second leg H is perpendicular to the first leg G and is configured to extend towards the first arm 204. A third leg I has a first end connected to a second end of the second leg H. The third leg I is perpendicular to the second leg H and is configured to extend towards the bottom side 106. A fourth leg J has a first end connected to a second end of the third leg I. The fourth leg J is parallel to the bottom side 106 and is configured to extend towards the first arm 204. A fifth leg K has a first end connected to a second end of the fourth leg J. The fifth leg K is perpendicular to the fourth leg J. The fifth leg K is configured to extend from the bottom side 106 towards the slit 210.

In one aspect, a printed circuit board is located within the smartphone housing. The battery, the power amplifier, the low noise amplifier, and the mixer are located on the printed circuit board. Each of the single element dual band antennas are ink jet printed on the outer surface of a respective side wall. Each of the ten T-shaped feed structures are ink jet printed on an inner surface of a respective side wall.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A twelve element dual band multiple-input multiple-output (MIMO) antenna for a smartphone, comprising:

a substrate having a top side, a bottom side, a first side wall, a second side wall opposite the first side wall, a third side wall perpendicular to the first side wall and a fourth side wall opposite to the third side wall;

twelve single element dual band antennas, wherein four of the single element dual band antennas are spaced along an outer surface of the first side wall, four of the single element dual band antennas are spaced along an outer surface of the second side wall, two of the single element dual band antennas are spaced along an outer surface of the third side wall and two of the single element dual band antennas are spaced along an outer surface of the fourth side wall, wherein each single element dual band antenna includes a meandered slot line having a first arm and a second arm, wherein the first arm is separated from the second arm by a slit;

twelve T-shaped feed structures, including:

a first set of four of the T-shaped feed structures located on an inner surface of the first side wall, wherein each of the first set of four T-shaped feed structures is located directly behind and centered with a single element dual band antenna located on the outer surface of the first side wall, a second set of four of the T-shaped feed structures located on an inner surface of the second side wall, wherein each of the second set of four T-shaped feed structures is located directly behind and centered with a single element dual band antenna located on the outer surface of the second side wall, a third set of two T-shaped feed structures located on an inner surface of the third side wall, wherein each of the third set of two T-shaped feed structures is located directly behind and centered with a single element dual band antenna located on the outer surface of the third side wall, a fourth set of two T-shaped feed structures located on an inner surface of the fourth side wall, wherein each of the fourth set of two T-shaped feed structures is located directly behind and centered with a single element dual band antenna located on the outer surface of the fourth side wall, wherein each T-shaped feed structure is connected through to a feed port located on the bottom side of the substrate;

a ground plane located on the bottom side of the substrate, wherein the first arm and the second arm are connected to the ground plane; and each antenna of the twelve element dual band MIMO antenna is configured to radiate from the first arm at a frequency of about 2.4 GHz and to radiate from the second arm at a frequency of about 3.5 GHz in response to an electrical signal applied to its respective feed port, wherein the first arm comprises:

a first leg perpendicular to the bottom side, wherein a first end of the first leg is connected to the ground plane and a second end of the first leg is located near an upper end of a respective side wall;

a second leg having a first end connected to a second end of the first leg, wherein the second leg is perpendicular to the first leg and wherein the second leg is configured to extend towards the second arm;

a third leg having a first end connected to a second end of the second leg, wherein the third leg is perpendicular to the second leg, wherein the third leg is configured to extend towards the bottom side;

a fourth leg having a first end connected to a second end of the third leg, wherein the fourth leg is parallel to the bottom side and is configured to extend towards the second arm; and a fifth leg having a first end connected to a second end of the fourth leg, wherein the fifth leg is perpendicular to the fourth leg, wherein the fifth leg is configured to extend from the bottom side towards the upper end of the respective side wall, a sixth leg connected to and perpendicular to the fifth leg, wherein the sixth leg extends towards second arm and ends at the slit.

2. The twelve element dual band MIMO antenna of claim 1, wherein the first leg has a length of about 5.98 mm, the second leg has a length of about 0.85 mm, the third leg has a length of about 5.5 mm, the fourth leg has a length of about 0.85 mm, the fifth leg has a length of about 5.5 mm, the sixth leg has a length of about 7 mm and a width of the meandered slot line of each of the first leg, the second leg, the third leg, the fourth leg, the fifth leg and the sixth leg is about 0.2 mm.

3. The twelve element dual band MIMO antenna of claim 1, wherein the substrate has length, width and thickness dimensions of about 150 mm×about 75 mm× about 0.8 mm respectively.

4. The twelve element dual band MIMO antenna of claim 1, wherein each single element dual band antenna has length, height and thickness dimensions of about 11.20 mm×about 5.98 mm×about 0.02 mm respectively.

5. The twelve element dual band MIMO antenna of claim 1, wherein the first side wall and the second side wall each have length, height and thickness dimensions of about 150 mm×about 6.8 mm×about 0.8 mm respectively and the third side wall and the fourth side wall each have length, height and thickness dimensions of about 75 mm×about 6 mm×about 0.8 mm respectively.

6. The twelve element dual band MIMO antenna of claim 1, wherein a width of the first arm is about 9.1 mm, and a width of the second arm is about 2.1 mm.

7. The twelve element dual band MIMO antenna of claim 1, wherein the twelve single element dual band antennas are spaced along their respective side walls such that:

a first single element dual band antenna is spaced at a distance of about 20.02 mm from a first end of the outer surface of the first side wall;

a second single element dual band antenna is spaced at a distance of about 19.3 mm from the first single element dual band antenna;

a third single element dual band antenna is spaced at a distance of about 39.4 mm from the second single element dual band antenna;

a fourth single element dual band antenna is spaced at a distance of about 19.3 mm from the third single element dual band antenna and at a distance of about 20.02 mm from a second end of the first side wall;

a fifth single element dual band antenna is spaced at a distance of about 15.3 mm from a first end of the outer surface of the third side wall;

a sixth single element dual band antenna is spaced at a distance of about 22 mm from the fifth single element dual band antenna and at a distance of about 15.3 mm from a second end of the outer surface of the third side wall;

a seventh single element dual band antenna is spaced at a distance of about 20.02 mm from a first end of the outer surface of the second side wall;

an eighth single element dual band antenna is spaced at a distance of about 19.3 mm from the seventh single element dual band antenna;

a ninth single element dual band antenna is spaced at a distance of about 39.4 mm from the eighth single element dual band antenna;

a tenth single element dual band antenna is spaced at a distance of about 19.3 mm from the ninth single element dual band antenna and at a distance of about 20.02 mm from a second end of the second side wall;

an eleventh single element dual band antenna is spaced at a distance of about 15.3 mm from a first end of the outer surface of the fourth side wall; and a twelfth single element dual band antenna is spaced at a distance of about 22 mm from the eleventh single element dual band antenna and at a distance of about 15.3 mm from a second end of the outer surface of the fourth side wall.

8. The twelve element dual band MIMO antenna of claim 1, wherein a height of each T-shaped feed structure is about 4.25 mm, and a width of the T of the T-shape is about 5.0 mm.

9. The twelve element dual band MIMO antenna of claim 1, wherein each feed port is connected to a 50Ω SMA connector.

10. A twelve element dual band multiple-input multiple-output (MIMO) antenna for a smartphone, comprising:

a substrate having a top side, a bottom side, a first side wall, a second side wall opposite the first side wall, a third side wall perpendicular to the first side wall and a fourth side wall opposite to the third side wall;

twelve single element dual band antennas, wherein four of the single element dual band antennas are spaced along an outer surface of the first side wall, four of the single element dual band antennas are spaced along an outer surface of the second side wall, two of the single element dual band antennas are spaced along an outer surface of the third side wall and two of the single element dual band antennas are spaced along an outer surface of the fourth side wall, wherein each single element dual band antenna includes a meandered slot line having a first arm and a second arm, wherein the first arm is separated from the second arm by a slit;

twelve T-shaped feed structures, including:

a first set of four of the T-shaped feed structures located on an inner surface of the first side wall, wherein each of the first set of four T-shaped feed structures is located directly behind and centered with a single element dual band antenna located on the outer surface of the first side wall, a second set of four of the T-shaped feed structures located on an inner surface of the second side wall, wherein each of the second set of four T-shaped feed structures is located directly behind and centered with a single element dual band antenna located on the outer surface of the second side wall, a third set of two T-shaped feed structures located on an inner surface of the third side wall, wherein each of the third set of two T-shaped feed structures is located directly behind and centered with a single element dual band antenna located on the outer surface of the third side wall, a fourth set of two T-shaped feed structures located on an inner surface of the fourth side wall, wherein each of the fourth set of two T-shaped feed structures is located directly behind and centered with a single element dual band antenna located on the outer surface of the fourth side wall, wherein each T-shaped feed structure is connected through to a feed port located on the bottom side of the substrate;

a ground plane located on the bottom side of the substrate, wherein the first arm and the second arm are connected to the ground plane; and each antenna of the twelve element dual band MIMO antenna is configured to radiate from the first arm at a frequency of about 2.4 GHz and to radiate from the second arm at a frequency of about 3.5 GHz in response to an electrical signal applied to its respective feed port; wherein the second arm comprises:

a first leg perpendicular to the bottom side, wherein a first end of the first leg is connected to the ground plane and a second end of the first leg is located near an upper end of a respective side wall;

a second leg having a first end connected to a second end of the first leg, wherein the second leg is perpendicular to the first leg and wherein the second leg is configured to extend towards the first arm;

a third leg having a first end connected to a second end of the second leg, wherein the third leg is perpendicular to the second leg, wherein the third leg is configured to extend towards the bottom side;

a fourth leg having a first end connected to a second end of the third leg, wherein the fourth leg is parallel to the bottom side and is configured to extend towards the first arm; and a fifth leg having a first end connected to a second end of the fourth leg, wherein the fifth leg is perpendicular to the fourth leg, wherein the fifth leg is configured to extend from the bottom side towards the slit.

11. The twelve element dual band MIMO antenna of claim 10, wherein the first leg has a length of about 5.98 mm, the second leg has a length of about 0.85 mm, the third leg has a length of about 5.5 mm, the fourth leg has a length of about 0.85 mm, the fifth leg has a length of about 5.0 mm, the slit is about 0.45 mm, and a width of the meandered slot line of each of the first leg, the second leg, the third leg, the fourth leg, and the fifth leg is about 0.2 mm.

12. A smartphone including a twelve element dual band multiple-input multiple-output (MIMO) antenna, comprising:

a smartphone housing;

a battery including a battery ground terminal and a battery voltage terminal, wherein the battery is located within the smartphone housing;

a radio frequency (RF) circuitry located within smartphone housing, the RF circuitry including at least:

a power amplifier connected to the battery ground terminal and the battery voltage terminal;

a low noise amplifier connected to the power amplifier;

a mixer operatively connected to the power amplifier and the low noise amplifier;

an RF circuitry voltage output terminal and an RF circuitry ground terminal;

a twelve element dual band MIMO antenna located within the smartphone housing, wherein the twelve element dual band MIMO antenna is configured as twelve single element dual band antennas, wherein each antenna of the twelve single element dual band antennas is connected to the RF circuitry ground terminal, wherein each single element dual band antenna comprises a meandered slot line having a first arm and a second arm, wherein the first arm is separated from the second arm by a slit; and twelve T-shaped feed structures, wherein each of the T-shaped feed structures is connected to a feed port, wherein each feed port is connected to the RF circuitry voltage output terminal;

wherein the RF circuitry is configured to generate electrical signals and each antenna of the twelve element dual band MIMO antenna is configured to radiate from the first arm at a resonant frequency of about 2.4 GHz and to radiate from the second arm at a resonant frequency of about 3.5 GHz in response to the electrical signals received at its respective feed port, wherein the first arm comprises:

a first leg perpendicular to the bottom side, wherein a first end of the first leg is connected to the ground plane and a second end of the first leg is located near an upper end of a respective side wall;

a second leg having a first end connected to a second end of the first leg, wherein the second leg is perpendicular to the first leg and wherein the second leg is configured to extend towards the second arm;

a third leg having a first end connected to a second end of the second leg, wherein the third leg is perpendicular to the second leg, wherein the third leg is configured to extend towards the bottom side;

a fourth leg having a first end connected to a second end of the third leg, wherein the fourth leg is parallel to the bottom side and is configured to extend towards the second arm; and a fifth leg having a first end connected to a second end of the fourth leg, wherein the fifth leg is perpendicular to the fourth leg, wherein the fifth leg is configured to extend from the bottom side towards the upper end of the respective side wall, a sixth leg connected to and perpendicular to the fifth leg, wherein the sixth leg extends towards second arm and ends at the slit.

13. The smartphone of claim 12, comprising:

a substrate located in the smartphone housing, the substrate having a top side, a bottom side, a first side wall, a second side wall opposite the first side wall, a third side wall perpendicular to the first side wall and a fourth side wall opposite to the third side wall.

14. The smartphone of claim 13, wherein the twelve single element dual band antennas are arranged along the outer surface of the first side wall, the second side wall, the third side wall and the fourth side wall such that:

four of the single element dual band antennas are spaced along an outer surface of the first side wall, four of the single element dual band antennas are spaced along an outer surface of the second side wall, two of the single element dual band antennas are spaced along an outer surface of the third side wall, and two of the single element dual band antennas are spaced along an outer surface of the fourth side wall.

15. The smartphone of claim 14, wherein:

a first set of four of the T-shaped feed structures is located on an inner surface of the first side wall, wherein each of the first set of four T-shaped feed structures is located directly behind and centered with a single element dual band antenna located on the outer surface of the first side wall, a second set of four of the T-shaped feed structures is located on an inner surface of the second side wall, wherein each of the second set of four T-shaped feed structures is located directly behind and centered with a single element dual band antenna located on the outer surface of the second side wall, a third set of two T-shaped feed structures located on an inner surface of the third side wall, wherein each of the third set of two T-shaped feed structures is located directly behind and centered with a single element dual band antenna located on the outer surface of the third side wall, and a fourth set of two T-shaped feed structures located on an inner surface of the fourth side wall, wherein each of the fourth set of two T-shaped feed structures is located directly behind and centered with a single element dual band antenna located on the outer surface of the fourth side wall.

16. The smartphone of claim 15, wherein:

the feed port is located on the bottom side of the substrate; and a ground plane located on the bottom side of the substrate, wherein the first arm and the second arm are connected to the ground plane.

17. The smartphone of claim 12, further comprising:

a printed circuit board located within the smartphone housing, wherein the battery, the power amplifier, the low noise amplifier and the mixer are located on the printed circuit board, wherein each of the single element dual band antennas are ink jet printed on the outer surface of a respective side wall; and wherein each of the ten T-shaped feed structures are ink jet printed on an inner surface of a respective side wall.

18. A smartphone including a twelve element dual band multiple-input multiple-output (MIMO) antenna, comprising:

a smartphone housing;

a battery including a battery ground terminal and a battery voltage terminal, wherein the battery is located within the smartphone housing;

a radio frequency (RF) circuitry located within smartphone housing, the RF circuitry including at least:

a power amplifier connected to the battery ground terminal and the battery voltage terminal;

a low noise amplifier connected to the power amplifier;

a mixer operatively connected to the power amplifier and the low noise amplifier;

an RF circuitry voltage output terminal and an RF circuitry ground terminal;

a twelve element dual band MIMO antenna located within the smartphone housing, wherein the twelve element dual band MIMO antenna is configured as twelve single element dual band antennas, wherein each antenna of the twelve single element dual band antennas is connected to the RF circuitry ground terminal, wherein each single element dual band antenna comprises a meandered slot line having a first arm and a second arm, wherein the first arm is separated from the second arm by a slit; and twelve T-shaped feed structures, wherein each of the T-shaped feed structures is connected to a feed port, wherein each feed port is connected to the RF circuitry voltage output terminal;

wherein the RF circuitry is configured to generate electrical signals and each antenna of the twelve element dual band MIMO antenna is configured to radiate from the first arm at a resonant frequency of about 2.4 GHz and to radiate from the second arm at a resonant frequency of about 3.5 GHz in response to the electrical signals received at its respective feed port, wherein the second arm comprises:

a first leg perpendicular to the bottom side, wherein a first end of the first leg is connected to the ground plane and a second end of the first leg is located near an upper end of a respective side wall;

a second leg having a first end connected to a second end of the first leg, wherein the second leg is perpendicular to the first leg and wherein the second leg is configured to extend towards the first arm;

a third leg having a first end connected to a second end of the second leg, wherein the third leg is perpendicular to the second leg, wherein the third leg is configured to extend towards the bottom side;

a fourth leg having a first end connected to a second end of the third leg, wherein the fourth leg is parallel to the bottom side and is configured to extend towards the first arm; and a fifth leg having a first end connected to a second end of the fourth leg, wherein the fifth leg is perpendicular to the fourth leg, wherein the fifth leg is configured to extend from the bottom side towards the slit.

* * * * *